United States Patent
Gu

(10) Patent No.: US 7,159,884 B2
(45) Date of Patent: Jan. 9, 2007

(54) FOLDABLE BICYCLE

(75) Inventor: Hong Jiun Gu, P.O. Box 99-141, Taipei (TW)

(73) Assignees: Hong Jiun Gu, Taipei (TW); Jar Chen Wang, Cerritos, CA (US)

( * ) Notice: Subject to any disclaimer, the term of this patent is extended or adjusted under 35 U.S.C. 154(b) by 187 days.

(21) Appl. No.: 10/911,250

(22) Filed: Aug. 3, 2004

(65) Prior Publication Data

US 2006/0027995 A1  Feb. 9, 2006

(51) Int. Cl.
*B62K 15/00* (2006.01)

(52) U.S. Cl. ........................................ 280/278; 280/287

(58) Field of Classification Search ................ 280/278, 280/287, 281.1, 87.05
See application file for complete search history.

(56) References Cited

U.S. PATENT DOCUMENTS

| | | | | |
|---|---|---|---|---|
| 5,186,482 A * | 2/1993 | Sapper | ........................ | 280/278 |
| 5,947,500 A * | 9/1999 | McGrane | ..................... | 280/287 |
| 6,032,971 A * | 3/2000 | Herder | ........................ | 280/278 |
| 6,273,442 B1 * | 8/2001 | Fallon et al. | ................ | 280/287 |
| 6,364,335 B1 * | 4/2002 | Mombelli | .................... | 280/287 |
| 6,425,598 B1 * | 7/2002 | Murayama | ................... | 280/278 |
| 6,595,539 B1 * | 7/2003 | Belli | ........................... | 280/287 |
| 6,799,771 B1 * | 10/2004 | Bigot | .......................... | 280/278 |
| 6,883,817 B1 * | 4/2005 | Chu | ............................. | 280/278 |
| 6,935,649 B1 * | 8/2005 | Lim | ............................. | 280/278 |
| 6,979,013 B1 * | 12/2005 | Chen | ........................... | 280/287 |
| 6,984,194 B1 * | 1/2006 | Ma | .............................. | 482/57 |
| 6,986,522 B1 * | 1/2006 | Sinclair et al. | .............. | 280/287 |

* cited by examiner

*Primary Examiner*—Tony Winner
(74) *Attorney, Agent, or Firm*—Raymond Y. Chan; David and Raymond Patent Group

(57) ABSTRACT

A foldable bicycle includes a foldable bicycle frame which comprises a main frame and an enclosing frame foldably to define a receiving cavity; a front and a rear wheel assembly rotatably supported by the bicycle frame; a bicycle driving unit operatively mounted on the bicycle frame and connected to the two wheel assemblies for driving at least one of the wheel assemblies rotating; a steering unit longitudinally extended from the front wheel assembly for steering a moving direction of the front wheel assembly; and a folding arrangement. The folding arrangement includes a folding link connecting the front and the rear wheel assembly, the bicycle driving unit, the steering unit, the enclosing frame, and the main frame in a foldable manner; and a folding actuator operatively connected with the folding link in such a manner that the foldable bicycle is adapted to move between a folded position and an unfolded position.

25 Claims, 33 Drawing Sheets

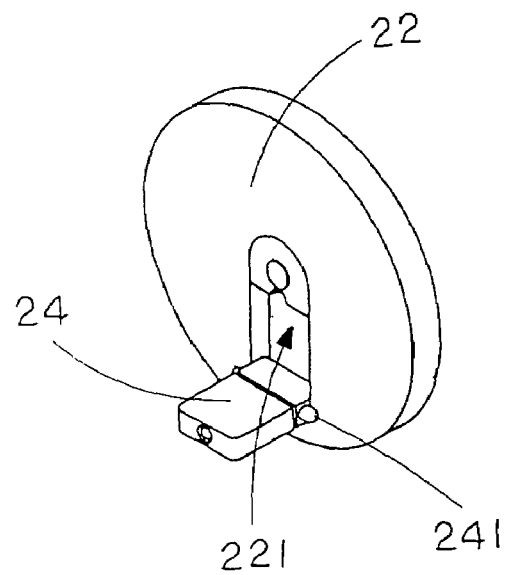
FIG.33
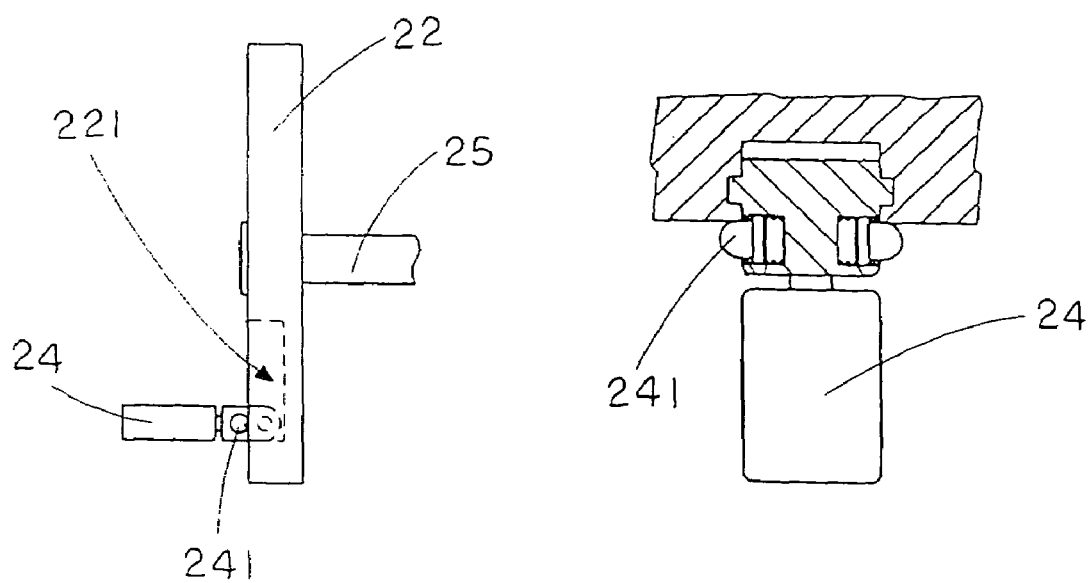
FIG.34
FIG.35

FOLDABLE BICYCLE

BACKGROUND OF THE PRESENT INVENTION

1. Field of Invention

The present invention relates to a bicycle, and more particularly to a foldable bicycle wherein it is adapted to be easily folded into a compact structure, such as a hand carry, for convenient transportation and storage, and unfolded for normal operation.

2. Description of Related Arts

Different types of bicycles have become very popular all around the world for use in short journey. Conventionally, there exist a wide variety of foldable bicycles which is adapted to be folded in a fairly small structure when not in use, and unfolded for use whenever necessary. Such kind of foldable bicycles is extremely ideal for a city in which the population density is high.

In order to accomplish a folding operation, a conventional foldable bicycle usually comprises a plurality of folding hinges provided in a bicycle frame in which at least two portions of the bicycle frame is adapted to be overlappedly folded to become a fairly small structure. Moreover, very often, the conventional foldable bicycle usually further comprises a plurality of retaining devices, such as a clip, for retaining the bicycle frame in the folded and small structure. When the user wants to unfold the bicycle, he/she normally has to release the retaining devices and then unfold the bicycle frame for subsequent normal operation.

There are several well-known yet difficult-to-resolve disadvantages for such above-mentioned conventional foldable bicycle. First of all, almost all foldable bicycles require the user to perform a series of steps or actions for folding the bicycle. That means the user has to actually perform folding operation for every single foldable component. Since a conventional bicycle usually comprises a lot of components operatively connected with each other, as a result, such a clumsy folding operation tends to be complicated and inconvenient.

Second, most of the foldable bicycles, when folded, are still bulky in size and therefore still inconvenient for storage and transportation. A more compact size after folding should be expected.

Third, even though the user of the foldable bicycle is satisfied about the size, there is a subtle but inherent problem with the folded bicycle frame in that it is difficult to find a suitable place for storing the bicycle. Consider the following scenario: a user of the foldable bicycle may find it uncomfortable for putting his/her folded bicycle, which has an inherent complicated physical structure and appearance, into his/her fancily decorated living room. Thus, notwithstanding that a foldable bicycle is suitable for being stored in one's home in terms of size, it may still be unsuitable in the sense that a folded bicycle may have a physical appearance which is wholly inconsistent in a domestic environment.

On the other hand, a conventional bicycle usually comprises a braking system comprising two braking pads movably mounted on the bicycle frame and communicated with two bicycle wheels of the bicycle respectively, and two brake actuation members mounted on two steering handles of the bicycle and operatively connected with the two braking pads in such a manner that by pressing the two brake actuation members towards the two in steering handles, the two braking pads are actuated to bias against the two bicycles wheels respectively so as to fictionally reduce a rotational speed of the two bicycle wheels for braking the bicycle.

This general structure of the braking system for a conventional bicycle, although popular, suffered a disadvantage that the actuation members have to be operated in conjunction with the steering handles.

SUMMARY OF THE PRESENT INVENTION

A main object of the present invention is to provide a foldable bicycle wherein the bicycle is adapted to be easily folded into a compact structure for convenient transportation and storage, and unfolded for normal operation.

Another object of the preset invention is to provide a foldable bicycle comprising a folding arrangement which connects the components of the bicycle in such a manner that only nominal actions are required for collectively folding and unfolding the component so as to fold or unfold the bicycle.

Another object of the present invention is to provide a foldable bicycle wherein it is adapted to be folded to form a hand carry which covers a substantial part of the mechanical structure of the bicycle so as to ensure maximum compatibility to the surrounding circumstances in which the folded bicycle is stored or placed. Moreover, the hand carry is adapted to be slid along the floor so as to facilitate easy transportation.

Another object of the present invention is to provide a foldable bicycle comprising a braking system which comprises at least one brake actuation member incorporated in a steering handle of the foldable bicycle such that that braking of the foldable bicycle can be actuated by operating the steering handle thereof, instead of employing such conventional breaking mechanism as pivotally moving the brake actuation members towards the steering handles in order to actuate braking of the conventional bicycle.

Another object of the present invention is to provide a foldable bicycle which comprises a pair of foldable pedals adapted to be folded and received in the bicycle frame so as to minimize a size of the foldable bicycle when it is folded.

Accordingly, in order to accomplish the above objects, the present invention provides a foldable bicycle, comprising:

a foldable bicycle frame which comprises a main frame and an enclosing frame foldably connected thereto to define a receiving cavity within the main frame and the enclosing frame;

a front and a rear wheel assembly rotatably supported by the bicycle frame;

a bicycle driving unit operatively mounted on the bicycle frame and connected to the two wheel assemblies for driving at least one of the wheel assemblies rotating with respect to the bicycle frame;

a steering unit, supported by the bicycle frame, is longitudinally extended from the front wheel assembly for steering a moving direction of the front wheel assembly; and a folding arrangement; which comprises:

a folding link connecting the front and the rear wheel assembly, the bicycle driving unit, the steering unit, the enclosing frame and the main frame in a foldably movable manner; and a folding actuator operatively connected with the folding link in such a manner that the foldable bicycle is adapted to move between a folded position that the enclosing frame is pivotally moved to enclose the main frame, wherein the front and the rear wheel assembly, the bicycle driving unit and the steering unit is foldably moved to receive in the receiving cavity, and an unfolded position that the enclosing frame, the front and the rear wheel assembly, the bicycle driving unit and the steering unit are unfolded from the receiving cavity to extend on the bicycle frame for normal operation.

These and other objectives, features, and advantages of the present invention will become apparent from the following detailed description, the accompanying drawings, and the appended claims.

BRIEF DESCRIPTION OF THE DRAWINGS

FIG. 33 is a perspective view of the driving rotor according to the above preferred embodiment of the present invention.

FIG. 34 is a side view of the driving rotor according to the above preferred embodiment of the present invention.

FIG. 35 is a schematic diagram of the driving rotor according to the above preferred embodiment of the present invention.

DETAILED DESCRIPTION OF THE PREFERRED EMBODIMENT

Figure 1:
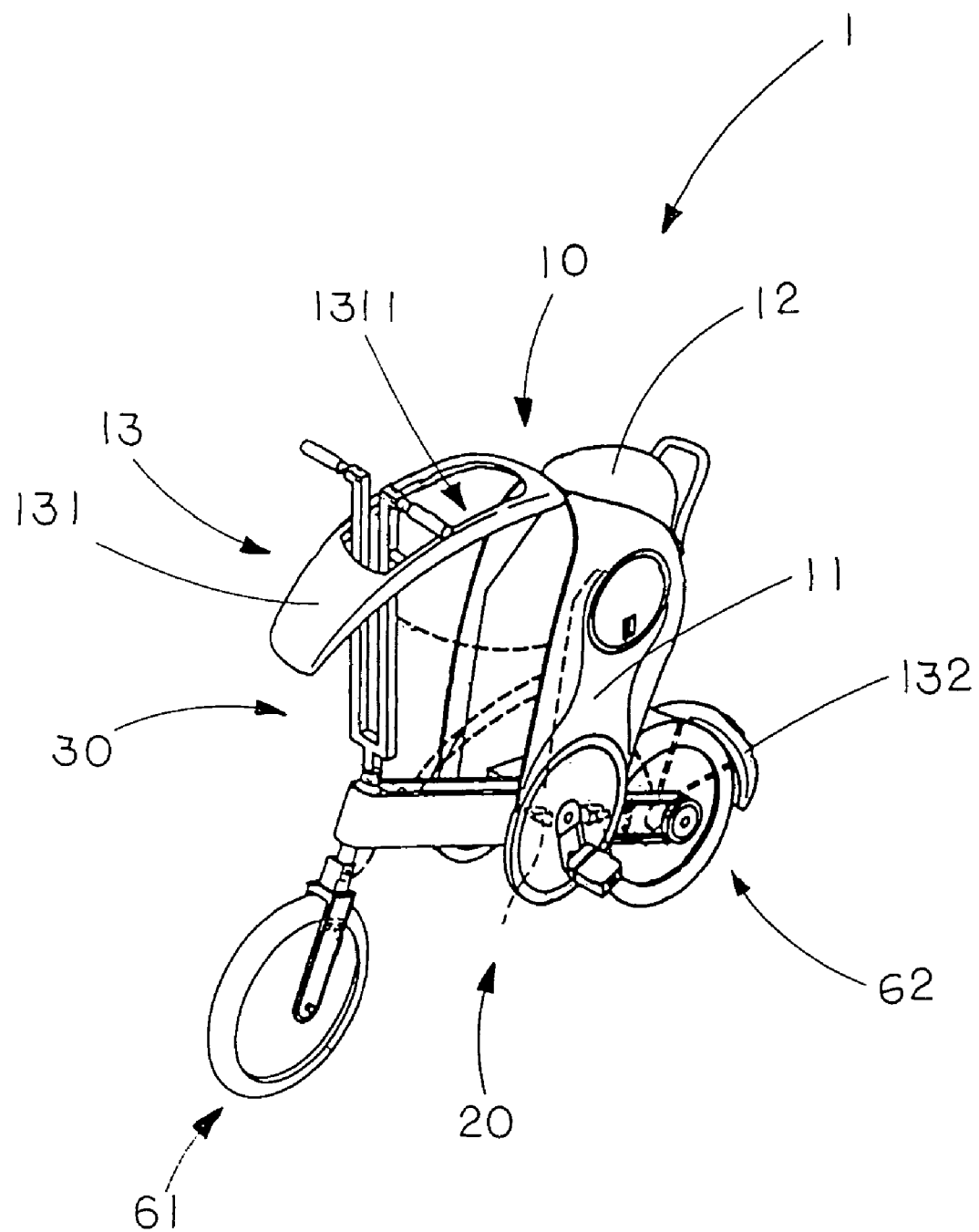
FIG. 1 is a perspective view of a foldable bicycle according to a preferred embodiment of the present invention.

Referring to FIG. 1 of the drawings, a foldable bicycle 1 according to a preferred embodiment of the present invention is illustrated, in which the foldable bicycle 1 comprises a bicycle frame 10, a bicycle driving unit 20, a steering unit 30, a braking system 40, and a foldable arrangement 50.

The bicycle frame 10 comprises a main frame 11 defining a receiving cavity and having a rider seat 12 provided on a top portion of the main frame 11, and an enclosing frame 13 connected with the main frame 11 in a pivotally movable manner to enclose the receiving cavity. In order to enhance a strength of the bicycle frame 10, the bicycle frame 10 further comprises a reinforcing frame 14 mounted underneath the main frame 11 in the receiving cavity for substantially reinforcing a strength of the main frame 11. Moreover, the foldable bicycle 1 further comprises a wheel assembly comprising a front and a rear wheel assembly 61, 62 for rotatably supporting the bicycle frame 10.

The bicycle driving unit 20 is operatively mounted on the bicycle frame 10 and connected to the rear wheel assemblies 62 for driving the foldable bicycle 1 moving forwardly or backwardly.

The steering unit 30 is supported by the bicycle frame 10 and is longitudinally extended from the front wheel assembly 61 for steering a moving direction thereof. In other words, the steering unit 30 is adapted to dictate a moving direction of the foldable bicycle 1.

The folding arrangement 50 comprises a folding link 51 and a folding actuator 52. The folding link 51 connects the front and the rear wheel assembly 61, 62, the driving unit 20, the steering unit 30, the main frame 11 and the enclosing frame 13 in a foldably movable manner.

The folding actuator 52 is operatively connected with the folding link 51 in such a manner that the foldable bicycle 1 is adapted to move between a folded position that the enclosing frame 14 is pivotally moved to enclose the main frame 11, wherein the two wheel assemblies 61, 62, the bicycle driving unit 20 and the steering unit 30 are driven by the folding link 51 to foldably moved into the receiving cavity for forming a compact structure, and an unfolded position that the enclosing frame 14, the front and the rear wheel assemblies 61, 62, the bicycle driving unit 20 and the steering unit 30 are unfolded from the receiving cavity to extend on the bicycle frame 1 for normal operation.

Referring to FIG. 1 of the drawings, the bicycle driving unit 20 comprises a securing device 21 mounted on the main frame 11, two driving rotors 22 rotatably mounted at two sides of the main frame 11 respectively, and a transmission device 23 dynamically connecting the respective driving rotor 22 to the rear wheel assembly 62 in such a manner that a rotational movement of the driving rotor 22 is adapted to be transmitted to the rear wheel assembly 62 through the transmission device 23.

Moreover the bicycle driving unit 20 further comprises a pair of driving paddles pivotally provided on the two driving rotors 22 respectively in such a manner that the driving paddles 24 are adapted to be received in the respective driving rotor 22, or transversely extended therefrom for a user to step on it so as to drive the respective driving rotor 22 to rotate.

According to the preferred embodiment, the two driving rotors 22 are connected with each other in such a manner that they are capable of rotating simultaneously and in phase.

The steering unit 30 comprises an elongated steering member 31 longitudinally and upwardly extended from the front wheel assembly 61, and two steering handles 32 transversely extended from two sides of a top portion of the steering member 31 respectively. The two steering handles 32 are adapted to be griped and twisted by the user of the foldable bicycle 1 so as to control a moving direction thereof.

The braking system 40 comprises a front and a rear brakes 42 supported by the bicycle frame 10 and operatively communicated with the front and the rear wheel assemblies 61, 62 for restricting a movement thereof respectively, and a brake actuation arrangement 41 operatively provided on the steering unit 30 and communicated with the front and the rear brakes 42 in such a manner that the brake actuation arrangement 41 is adapted to actuate the braking of the front and the rear wheel assemblies 61, 62 by the front and the rear brakes 42.

Referring to FIG. 1 of the drawings, the enclosing frame 13 comprises a front enclosing cover 131, having a folding slot 1311 formed thereon, pivotally mounted on a front side of the main frame 11 in such a manner that when the foldable bicycle 1 is in the unfolded position, the front enclosing cover 131 is adapted to be pivotally and outwardly extended from the main frame 11 wherein the steering unit 30 is longitudinally extended from the front wheel assembly 61 to pass through the folding slot 1311. Conversely, when the foldable bicycle 1 is in the folded position, the front enclosing cover 131 is adapted to pivotally and inwardly move towards the main frame 11 for enclosing the receiving cavity from the front.

Figure 2:
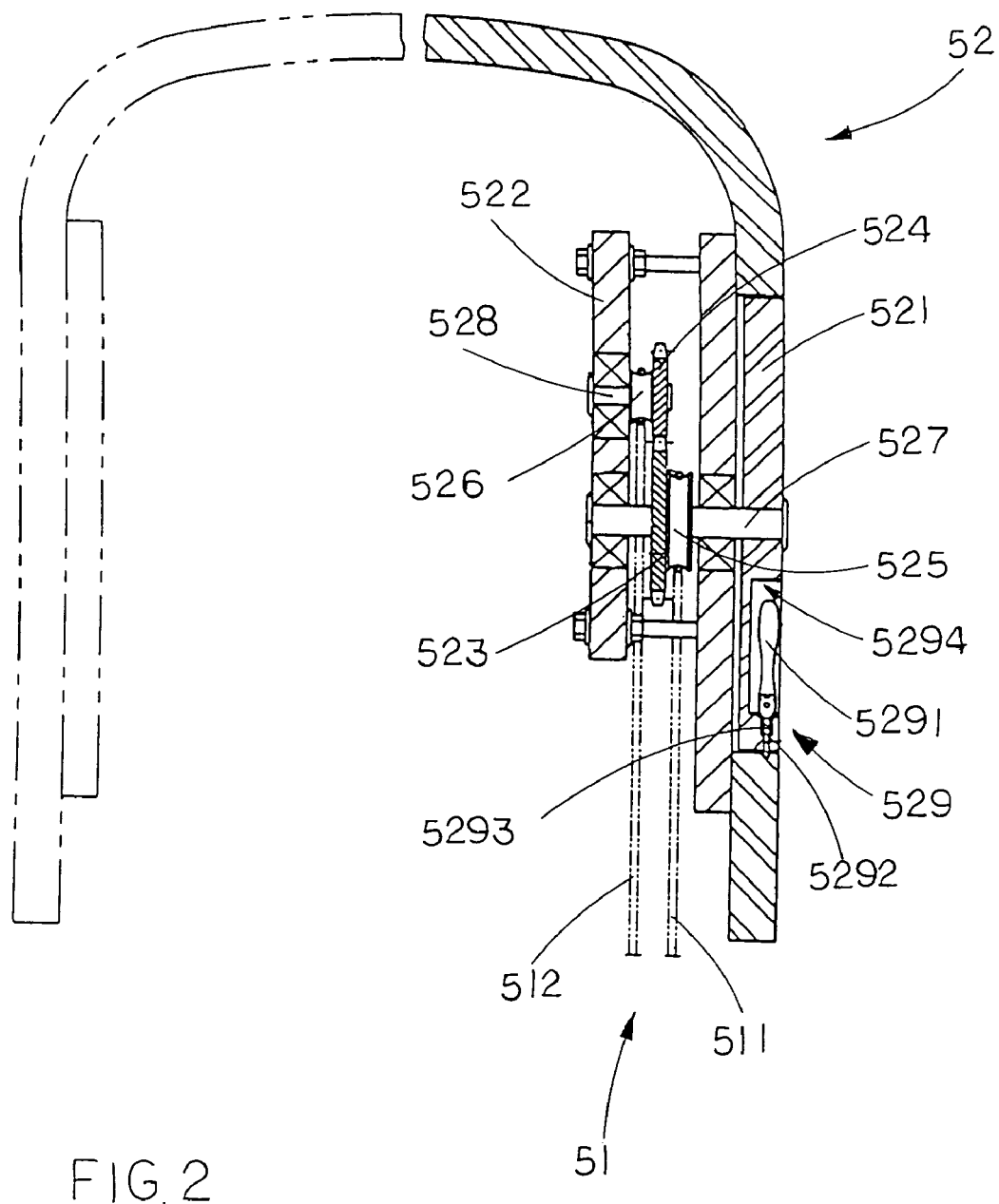
FIG. 2 is a sectional view of the folding actuator of the foldable bicycle according to the above preferred embodiment of the present invention.
Figure 3:
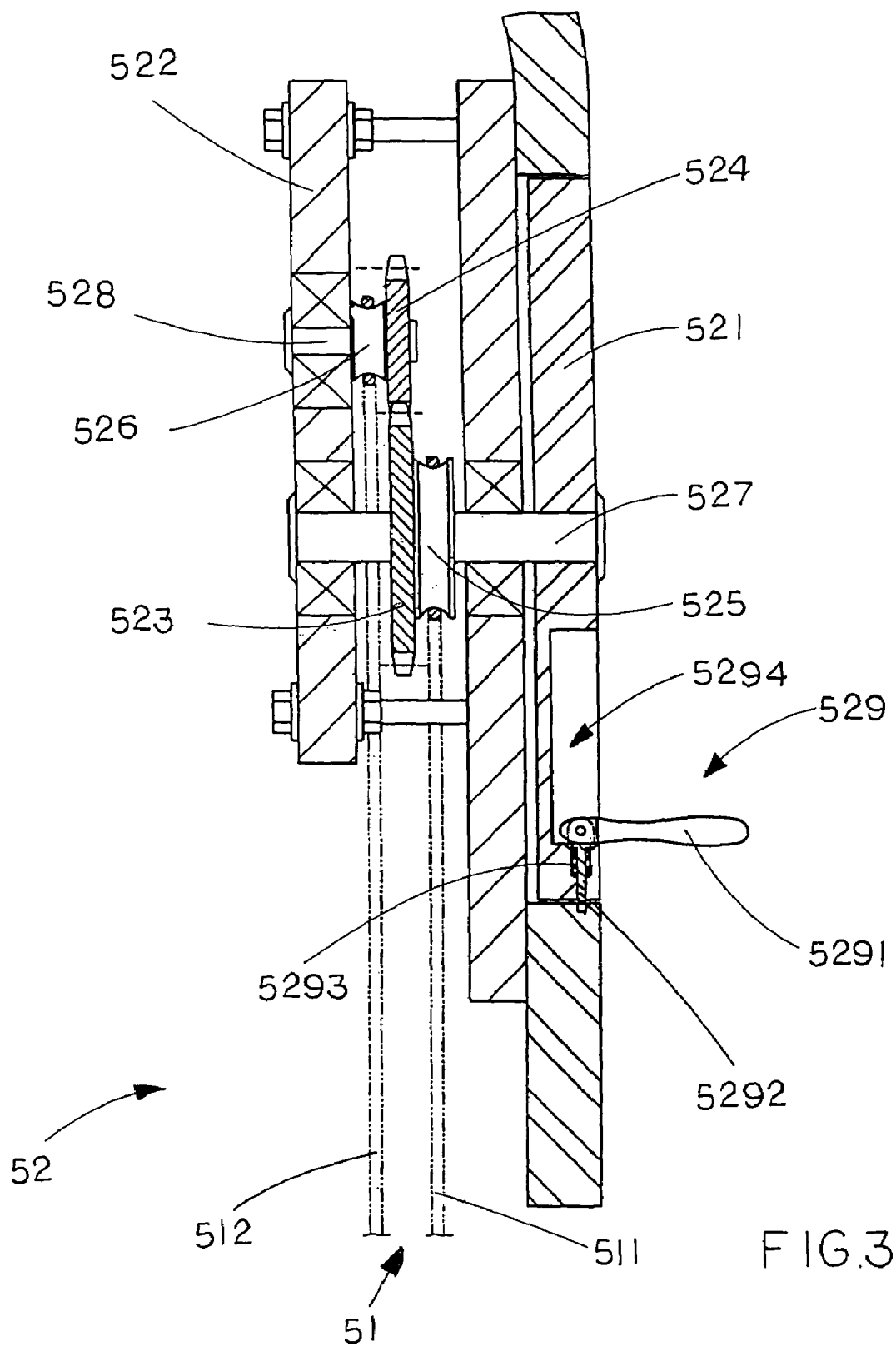
FIG. 3 is a schematic sectional view of the folding actuator of the foldable bicycle according to the above preferred embodiment of the present invention.

Referring to FIG. 1 to FIG. 3 of the drawings, the main frame 11 has a through actuation slot 111 provided on a side surface thereof wherein the folding actuator 52 is operatively mounted in the actuation slot 111. According to the preferred embodiment, the folding actuator 52 comprises a fold actuation member 521, a fold supporting member 522, a first and a second operation gears 523, 524, and a first and a second transmission pulleys 525, 526.

Referring to FIG. 3 of the drawings, the fold actuation member 521 is coaxially mounted with the first transmission pulley 525 and then with the first operation gear 523 via a main axle 527, wherein the first operation gear 523 is engaged with the second operation gear 524 thereabove. Moreover, the second operation gear 524 is coaxially mounted with the second transmission pulley 526 via a secondary axle 528. Both the main axle 527 and the secondary axle 528 are extended to mount on the fold supporting member 522 such that the first and the second transmission pulleys 525, 526 and the first an the second operation gears 523, 524 are adapted to rotate with respect to the fold supporting member 522.

The folding actuator 52 further comprises an actuation locking arrangement 529 which contains an actuation compartment 5294 indently provided at a bottom portion of the folding actuator 52, a guiding hole provided on a bottom sidewall of the actuation compartment 5294, and a latching hole, which is aligned with the guiding hole, formed on a bottom side surface of the actuation slot 111. Moreover, the actuation locking arrangement 529 further comprises an actuation handle 5291, a locking pin 5292 extended underneath the actuation handle 5291 in the guiding hole and adapted to be driven by the actuation handle 5291, and a resilient element 5293 mounted in the guiding hole for normally applying an upward urging force to the locking pin 5292.

According to the preferred embodiment, the actuation handle 5291 is adapted to be selectively and pivotally moved between an idle position and an operating position, wherein in the idle position, the actuation handle 5291 is arranged to be pivotally received in the actuation compartment 5294 for driving the locking pin 5292 to downwardly move along the guiding hole into the latching hole so as to block up a rotational movement of the folding actuator 52, wherein in the operating position, the actuation handle 5291 is pivotally move to transversely and outwardly extended from the actuation compartment 5294 in which the locking pin 5292 is released from the downward driving force exerted by the actuation handle 5291 and is driven upwardly by the resilient element 5293 so that the locking pin 5292 is pulled out from the latching hole. As a result, the folding actuator 52 is adapted to rotate with respect to the main frame 11.

It is worth elaborating that when the folding actuator 52 is driven to rotate, the folding actuator 52 is adapted to drive the first transmission pulley 525 and the first operation gear 523 to rotate about the main axle 572. The effect of this is that the first operation gear 523 is adapted to drive the second operation gear 524 which in turn drives the second transmission pulley 526 to rotate.

Moreover, the folding link 51 is arranged to link the first and the second transmission pulleys 525, 526 with the bicycle frame 1, the driving unit 20, and the steering unit 30 such that the folding actuator 52 is adapted to actuate to fold the foldable bicycle 1 into the folded position by the rotation of the folding actuator 52.

Figure 4:
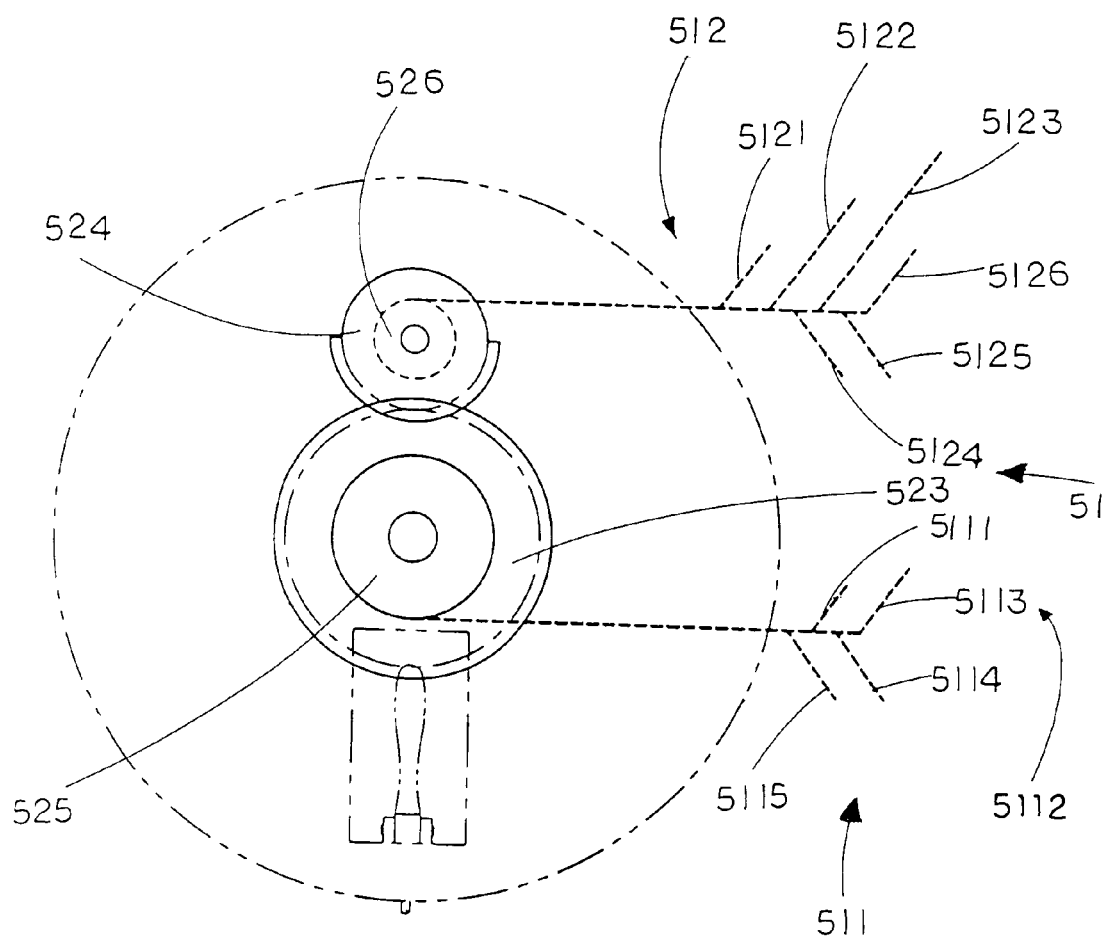
FIG. 4 is a schematic diagram of the first and the secondary operation pulleys according to the above preferred embodiment of the present invention.

Referring to FIG. 4 of the drawings, the folding link 51 comprises a primary folding link 511 which is linked with the first transmission pulley 525, and a secondary folding link 512 which is linked with the second transmission pulley 526. According to the preferred embodiment, the first operation gear 523 has a plurality of engaging teeth formed peripherally thereon whereas the second operation gear 524 has a plurality of engaging teeth formed peripherally on only half of its circumference to define an effective driven distance which indicates the maximum possible rotational distance which the second operation gear 524 may be driven to rotate by the first operation gear 523.

In other words, when, upon driven by the first operation gear 523, the second operation gear 524 has traveled the effective driven distance, subsequent rotation of the first operation gear 524 can no longer drive the second operation gear 524 to rotate, for the teeth of the second operation gear 524 vanishes to engage with the first operation gear 523.

Therefore, the primary folding link 511 is adapted to travel a longer distance than that of the secondary folding link 512 for actuating the foldable bicycle 1 to fold in the folded position.

According to the preferred embodiment of the present invention, the foldable arrangement 50 further comprises an auxiliary fold triggering device 53 operatively provided on the foldable bicycle 1 so as to facilitate and coordinate a folding operation of its various parts, wherein the auxiliary fold triggering device 53 comprises a steering unit trigger, a wheel assembly trigger, a driving unit trigger 533, and an enclosing cover trigger provided on the steering unit 30, the wheel assembly, and the steering unit 20, and the enclosing frame 13 respectively.

Accordingly, referring to FIG. 4 of the drawings, the primary folding link 511 comprises a steering folding link 5111, a driving folding link and a enclosing cover folding link 5114 which are extended to link with the steering unit 30, the wheel assembly and the driving unit 20 respectively and merge together to connect with the first transmission pulley 525.

Similarly, the secondary folding link 512 comprises a steering handle trigger link 5121, a steering member trigger link 5122, a driving trigger link 5123, and an enclosing frame trigger link 5124 which are extended to link with the steering unit trigger, the wheel assembly trigger, the driving unit trigger 533, and the enclosing cover trigger 534 respectively and merge together to link with the second transmission pulley 526.

It is worth mentioning that each of the steering folding link 5111, the driving folding link, the enclosing cover folding link 5114, the steering handle trigger link 5121, the steering member trigger link 5122, the driving trigger link, and the enclosing cover trigger link 5124 are embodied to have a predetermined length in such a manner that when the foldable bicycle is being folded or unfolded, the difference in length of the steering folding link 5111, the wheel folding link 5112, the driving folding link, the steering handle trigger link 5121, the steering member trigger link 5122, and the driving trigger link 5123 would limit the sequence at which each of the respective components to which the above-mentioned links is connected. In other words, by adjusting a length of the various links, a folding sequence of the foldable bicycle 1 can be varied to suit different applications and circumstances.

Figure 5:
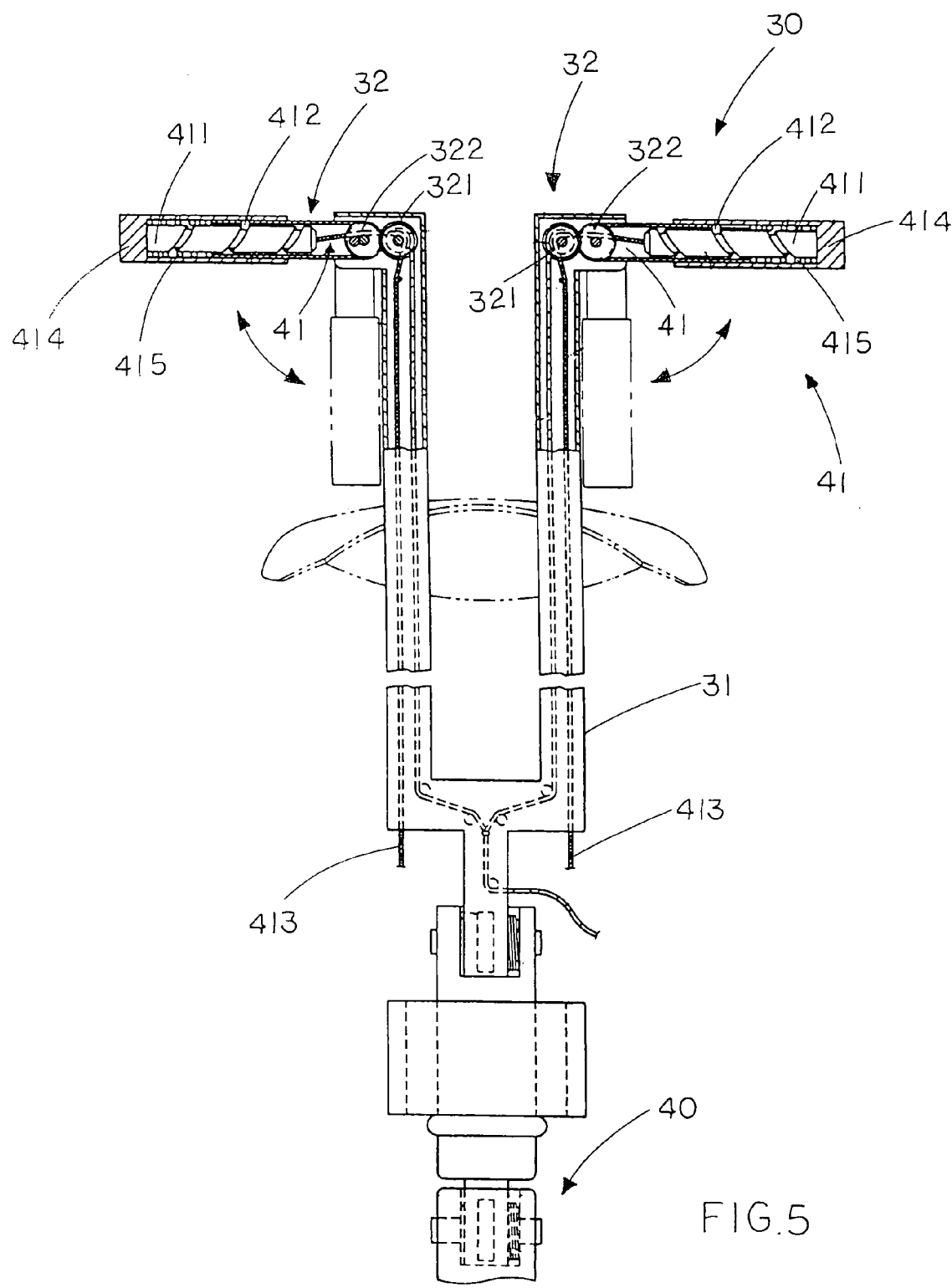
FIG. 5 is a section side view of the steering unit according to the above preferred embodiment of the present invention.

Referring to FIG. 5 of the drawings, each of the two steering handles 32 comprises a conveying gear 321 and a turning gear 322 provided therein in which the steering handles 32 are adapted to be pivotally folded towards the two sides of the steering member 31 respectively in such a manner that the steering handles 32 and the steering member 31 are capable of passing through the folding slot 1311 of the front enclosing cover 131. According to the preferred embodiment, each of the two steering handles 32 is tubular and elongated in shape wherein the brake actuation arrangement 41 is disposed inside the two steering handles 32.

Accordingly, the brake actuation arrangement 41 comprises two brake actuation rotors 411 disposed in the two steering handles 32 respectively, and two rotor ridges 412 protruded from the inner surfaces of the steering handles 32 respectively wherein the respective brake actuation rotor 411 is arranged to be engaged with the respective rotor ridge 412 in a longitudinally movable manner. Each of the brake actuation rotors 411 is preferably embodied as an elongated cylinder having a plurality screwing teeth peripherally formed thereon for engaging with the respective rotor ridge 412.

Figure 6:
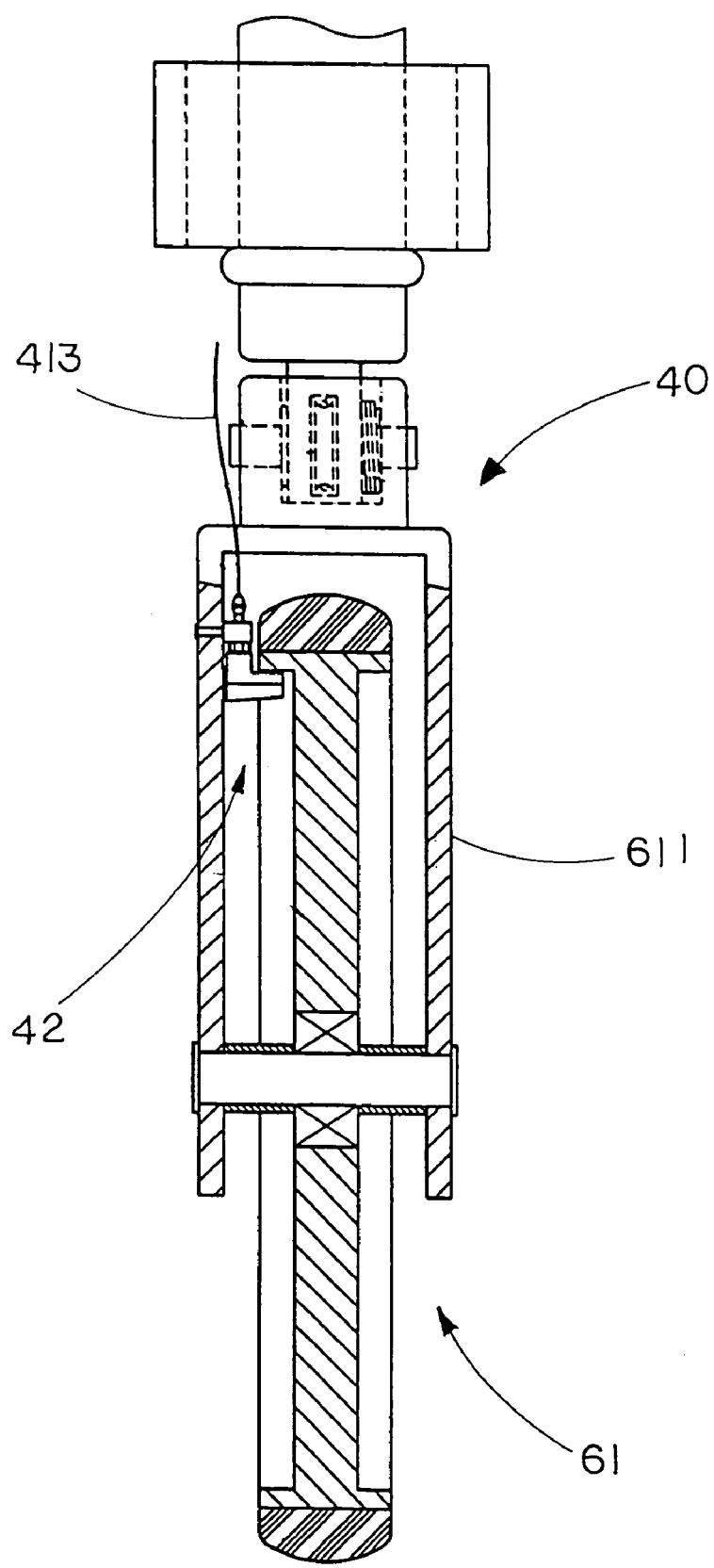
FIG. 6 is a sectional side view of one of the front and the rear brake according to the above preferred embodiment of the present invention.

Moreover, referring to FIGS. 5 to 6 of the drawings, the brake actuation arrangement 41 further comprises two brake cables 413 extended from inner ends of the brake actuation rotors 411 respectively through the respective conveying gear 321 and along the elongated steering member 31 wherein the brake cables 413 are ultimately connected to the front and the rear brakes 42 for exerting a braking force to the front and the rear wheel assembly 61, 62 respectively. According to the preferred embodiment, when the brake actuation rotors 411 move longitudinally in the steering handles 32, the longitudinal movement of the brake actuation rotor 411 would pull the respective brake cable 413 to actuate one of the front and the rear brakes 42. Therefore, the brake actuation arrangement 41 further comprises two braking grips 414 rotatably mounted on the two steering handles 32 respectively wherein each of the braking grips 414 is connected to the respective brake actuation rotor 411 such that each of the braking grips 414 is adapted to rotatably drive the respective brake actuation rotor 411 longitudinally moving within the respective steering handle 32 as guided by the respective rotor ridge 412 so as to actuate a braking of the foldable bicycle 1.

Similarly, when the brake actuation rotor 411 rotates in the opposite direction, the respective brake cable 413 is relieved from the pulling force so as to relive the braking to the front and the rear wheel assembly 61, 62.

The brake actuation arrangement 41 further comprises a restoring members 415 each of which is preferably embodied as an elastic spring mounted within the steering handles 32 respectively for normally exerting a biasing force to the brake actuation rotors 411 so as to normally retain the respective brake cables 413 to be free from any pulling force which actuates the front and the rear brakes 42.

Figure 7:
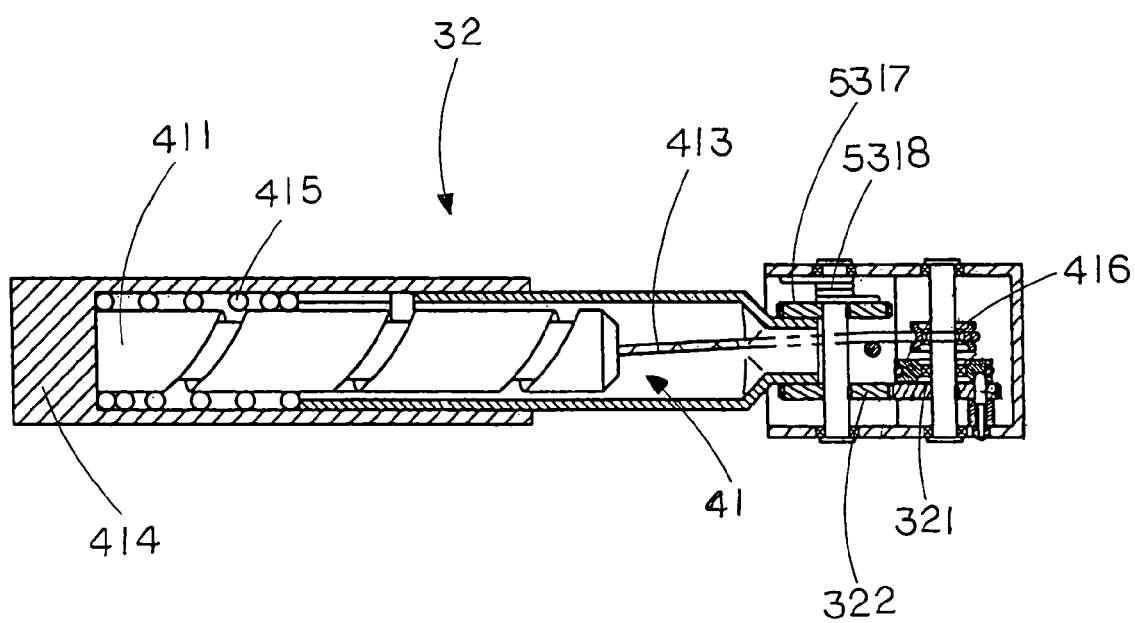
FIG. 7 is a sectional side view of one of the steering handle according to the above preferred embodiment of the present invention.

Referring to FIG. 7 of the drawings, in order to facilitate efficient pulling of the brake cables 413, the brake actuation arrangement 41 further comprises two cable pulleys 416 coaxially mounted with the conveying gears 321 provided on the steering handles 32 respectively, wherein each of the brake cables 413 is extended from the respective brake actuation rotor 411 to one of the front and the rear brakes 42 through the respective cable pulley 416.

According to the preferred embodiment, the steering unit trigger of the auxiliary fold actuator 53 comprises two steering handle triggers 531 each of which is also coaxially mounted with the conveying gear 321 in each of the steering handles 32 wherein the steering handle trigger link 5121 is operatively connected with the steering handle trigger 531.

Figure 8:
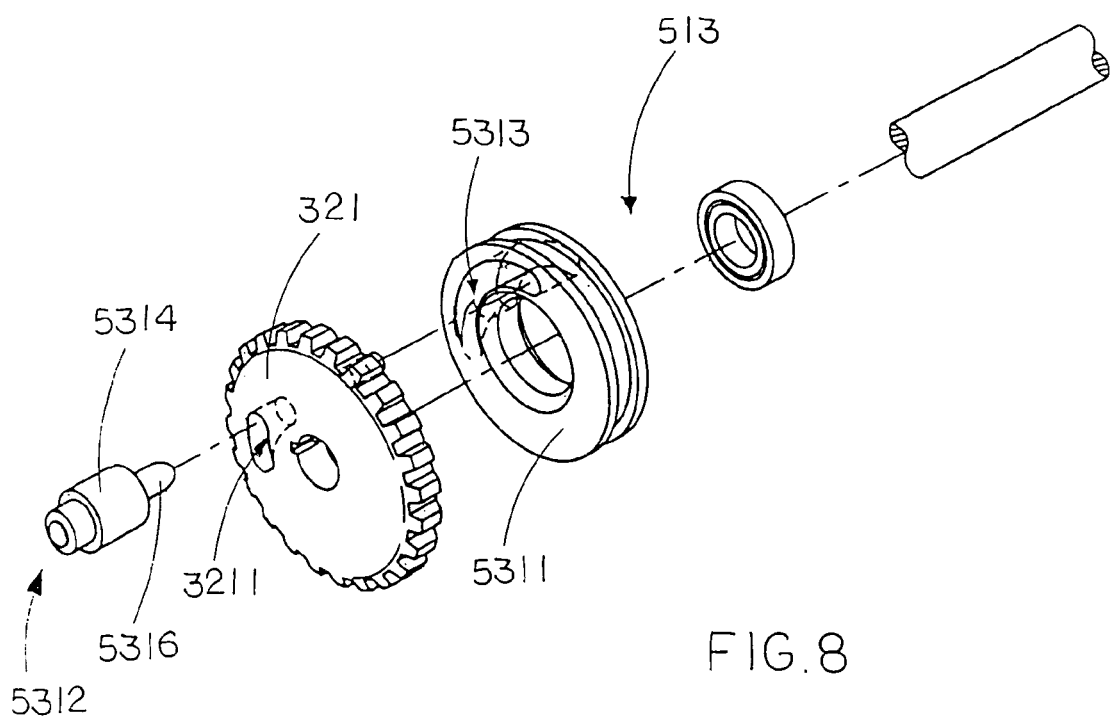
FIG. 8 is an exploded perspective view of the steering handle trigger according to the above preferred embodiment of the present invention.
Figure 9:
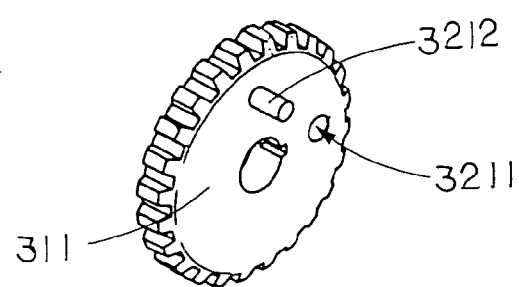
FIG. 9 is a perspective view of the conveying gear according to the above preferred embodiment of the present invention.
Figure 10:
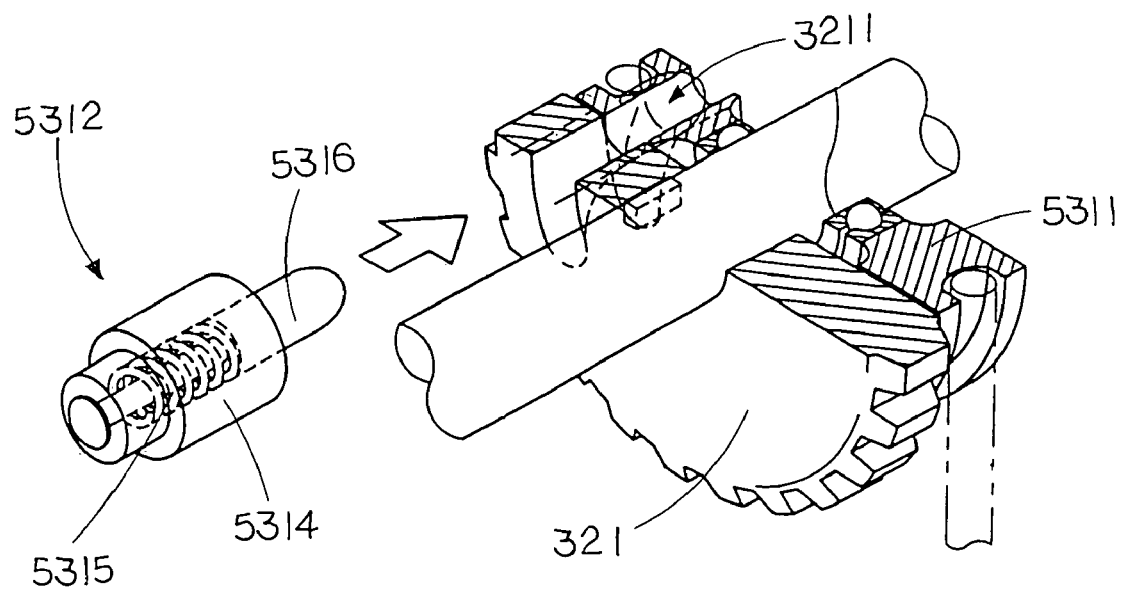
FIG. 10 is a partially exploded perspective view of the steering handle trigger according to the above preferred embodiment of the present invention.
Figure 11:
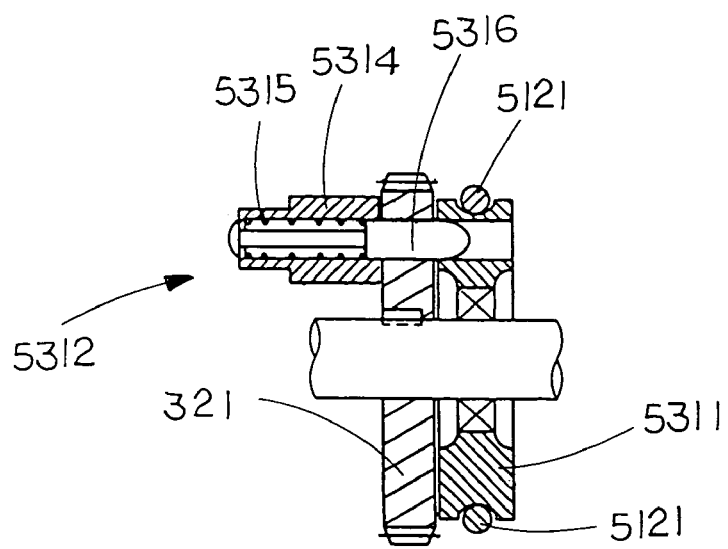
FIG. 11 is a sectional side view of the steering handle trigger according to the above preferred embodiment of the present invention, illustrating that the first steering stopper is in the locked position.

Referring to FIG. 8 of the drawings, the steering handle trigger 531 comprises a circular trigger rotor 5311 having a link slot indently and peripherally formed thereon for mounting with the steering handle trigger link 5121, and a steer stopper 5312 penetrably mounted on the conveying gear 321 and the circular trigger rotor 5311 for controlling a lateral rotational movement of the conveying gear 321 as well as the circular trigger rotor 5311.

Referring to FIG. 8 to FIG. 11 of the drawings, the circular trigger rotor 5311 further has a first engaging slot 5313, defining an first inclined sidewall in an first pusher end thereof, formed thereon whereas the conveying gear 321 has an first insertion slot 3211, defining an first inclined boundary wall, formed thereon which is substantially aligned with the first engaging slot 5313.

Furthermore, the conveying gear 321 further has a first locking latch 3212 outwardly protruded therefrom for inserting into the first engaging slot 5313 of the circular trigger rotor 5311.

Figure 12A:
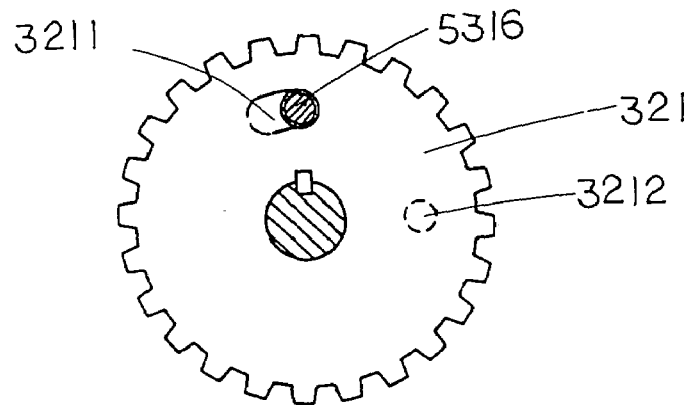
FIG. 12A to FIG. 12C are schematic diagrams of the operation of the steering handle trigger according to the above preferred embodiment of the present invention, illustrating that the first steering stopper is in the locked position.
Figure 12B:
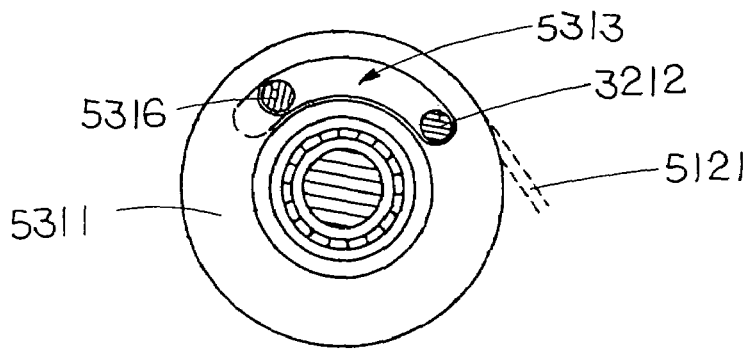
Figure 12C:
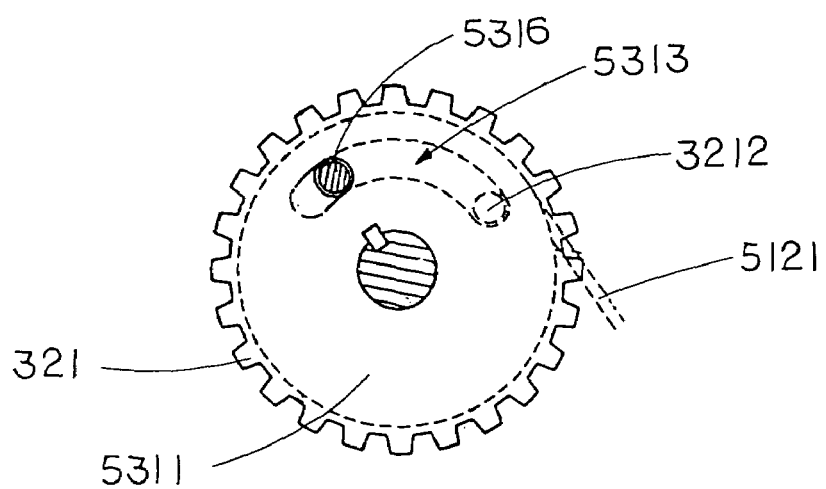
Figure 13:
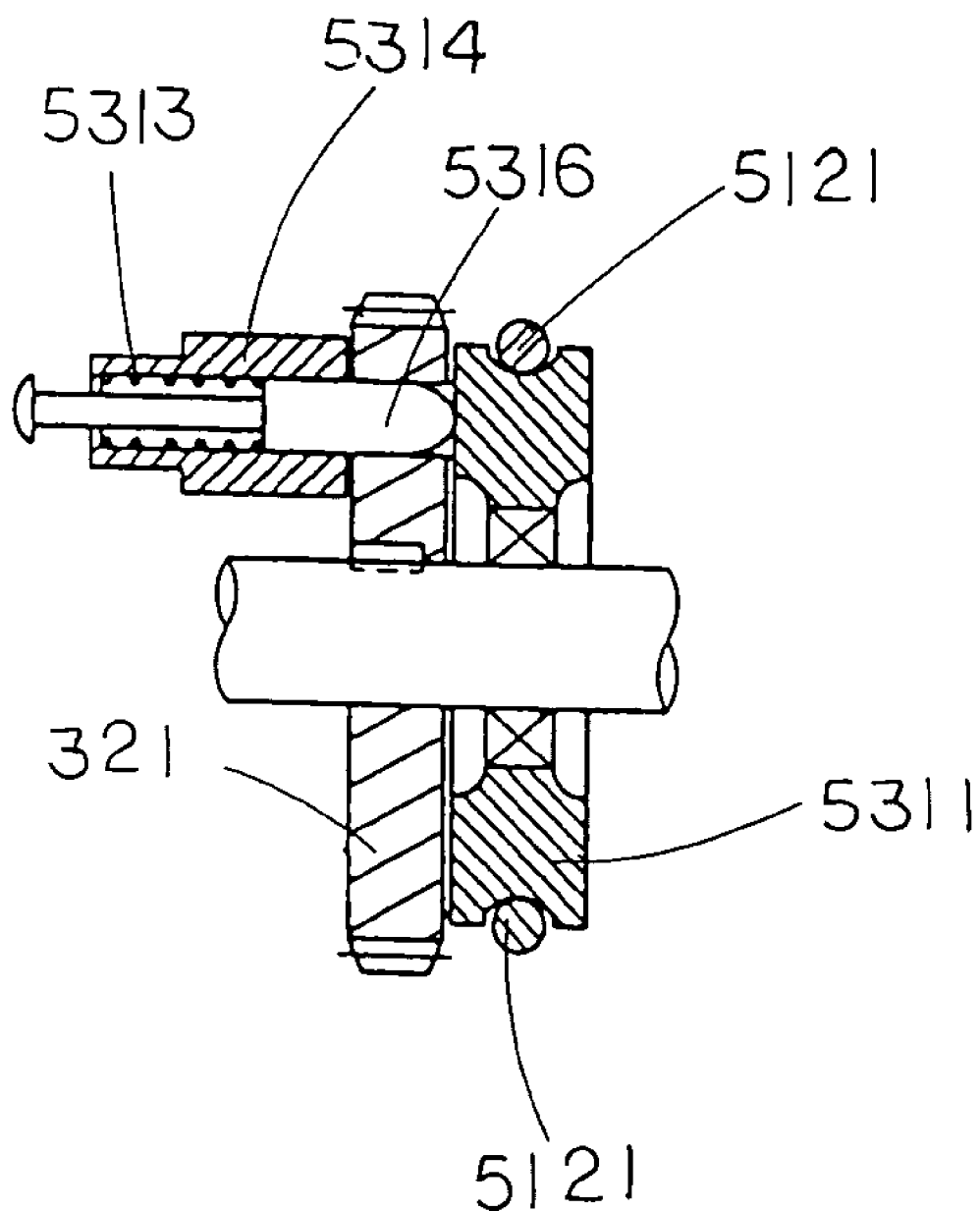
FIG. 13 is a sectional side view of the steering handle trigger according to the above preferred embodiment of the present invention, illustrating that the first steering stopper is in the unlocked position.

The first steering stopper 5312 comprises a first main body 5314, a first resilient member 5315 mounted in the first main body 5314, and a first stopper head 5316 adapted to be slidably pushed to normally extend from the first main body 5314 by the first resilient member 5315 between a locked position which is illustrated in FIG. 12A to FIG. 12C of the drawings, and an unlocked position, which is illustrated in FIG. 13 and FIG. 14A to FIG. 14C of the drawings.

Referring to FIG. 12A to FIG. 12C of the drawings, when the first steering stopper 5312 is in the locked position, the first stopper head 5314 is fully extended from the first main body 5314 to penetrate through the first insertion slot 3211 all the way to the first pusher end of the first engaging slot 5313 wherein the first locking latch 3212 is inserted into another end of the first engaging slot 5313, in such a manner that a lateral movement between the circular trigger rotor 5311 and the conveying gear 321 is substantially blocked. It is worth mentioning that since the turning gear 322 is engaged with the conveying gear 321, therefore, where the conveying gear 321 is locked in movement, the turning gear 322 is also locked in position by the conveying gear 321 so as to retain the steering handle 32 longitudinally extended from the elongated steering member 31.

Figure 14A:
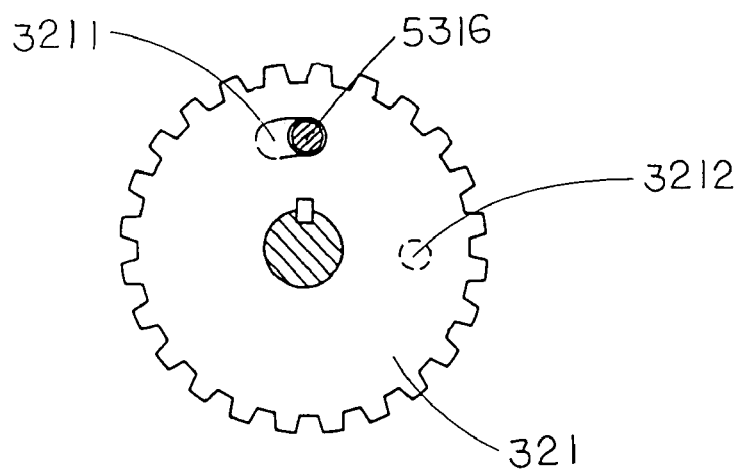
FIG. 14A to FIG. 14C are schematic diagrams of the operation of the steering handle trigger according to the above preferred embodiment of the present invention, illustrating that the first steering stopper is in the unlocked position.
Figure 14B:
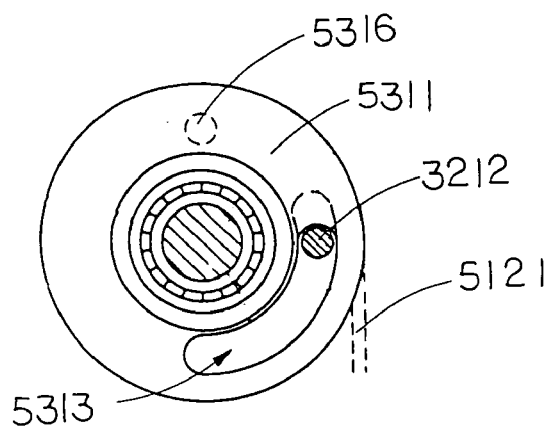

Referring to FIG. 13, FIG. 14A to FIG. 14C of the drawings, when the first steering stopper 5312 is in the unlocked position, the first stopper head 5314 is retracted from the first engaging slot 5313 by rotating the circular trigger rotor 5311 in such a manner that the first inclined sidewall of the first engaging slot 5313 is adapted to rearwardly push the first stopper head 5314 disengaging with the first engaging slot 5313 and received in the first insertion slot 3211 of the conveying gear 321, as shown in FIG. 14A of the drawings. Note that the rotation of the circular trigger rotor 5311 is actuated by the steering handle trigger link 5121.

Figure 14C:
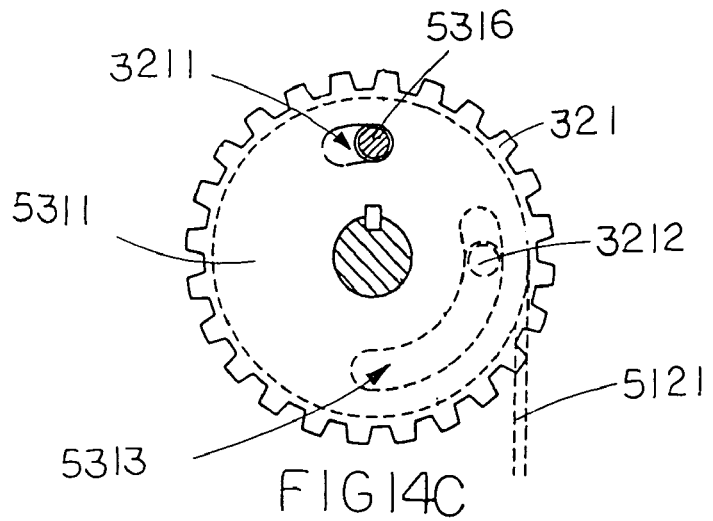
Figure 15:
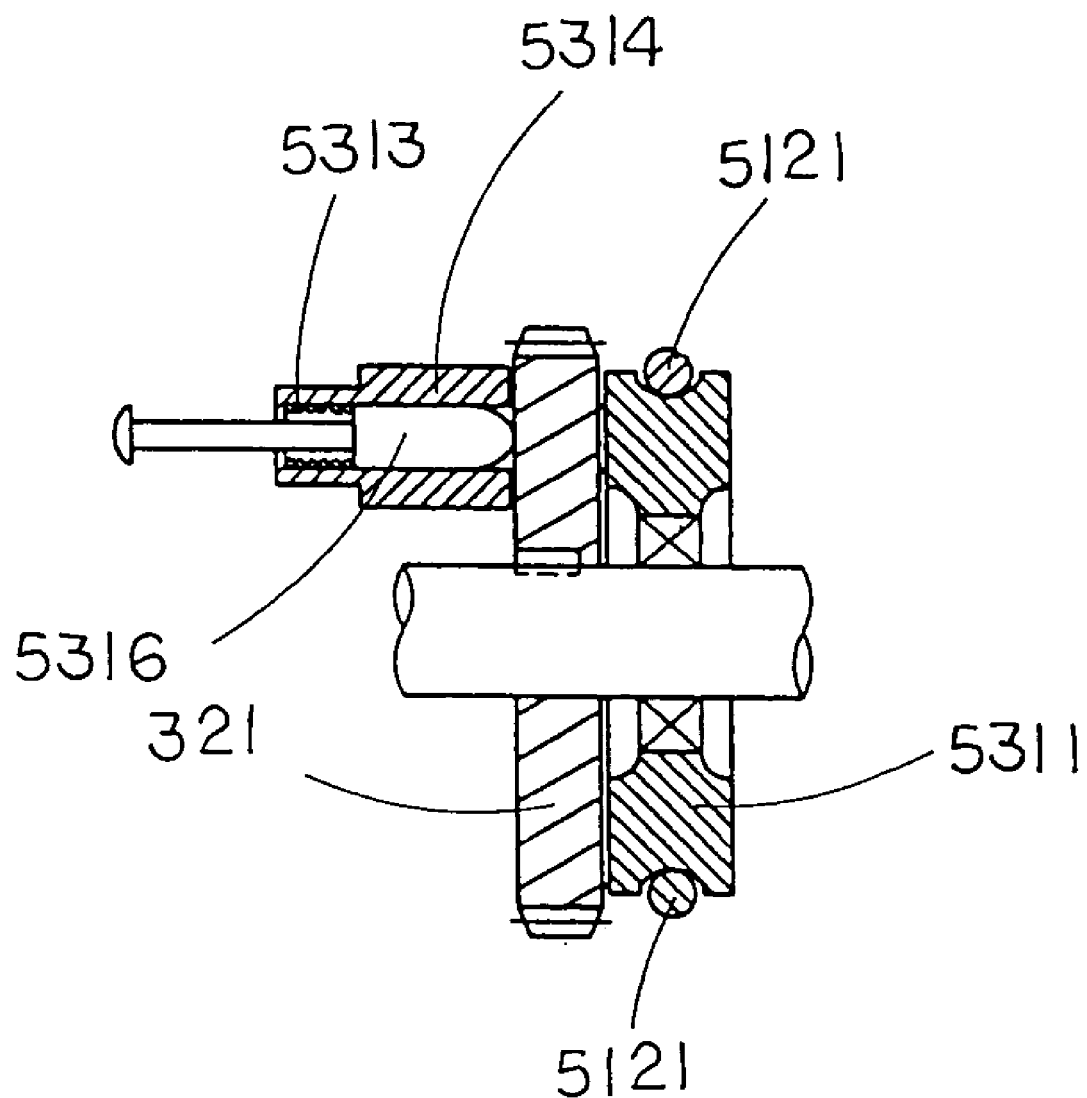
FIG. 15 is a section side view of the steering handle trigger according to the above preferred embodiment of the present invention, illustrating that the steering head is completely moved out of the first insertion slot of the conveying gear.
Figure 16A:
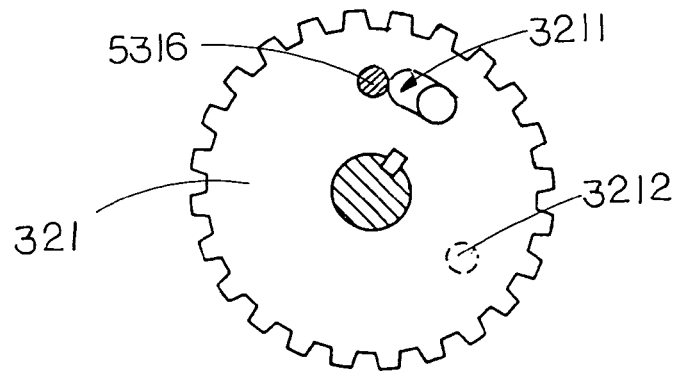
FIG. 16A to FIG. 16C are schematic diagrams of the operation of the steering handle trigger according to the above preferred embodiment of the present invention, illustrating that the steering head is moved out of the first insertion slot of the conveying gear.
Figure 16B:
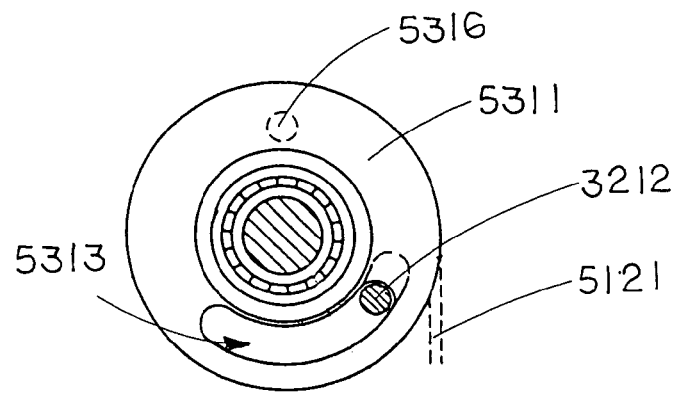
Figure 16C:
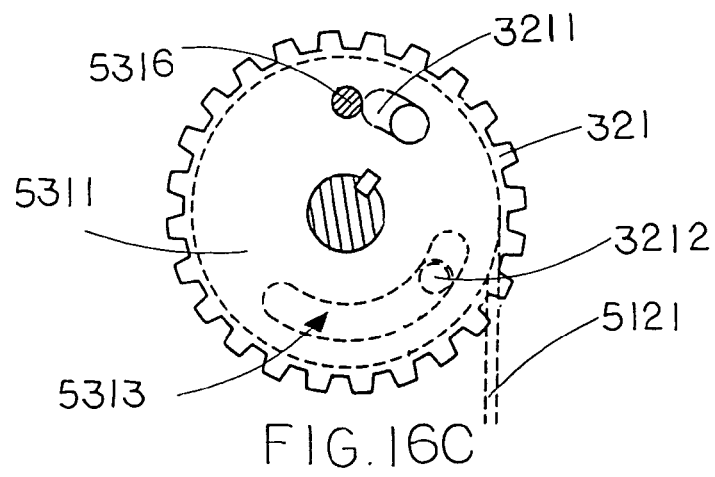

When the circular trigger rotor 5311 continues rotating, the first locking latch 3212 will ultimately reach the first pusher end of the first engaging slot 5313. However, it is important to mention that a length of the first locking latch 3212 is embodied as longer than that of the first stopper head 5314 such that the first inclined sidewall is incapable of pushing out the first locking latch 3212, as shown in FIG. 14C of the drawings.

Figure 17:
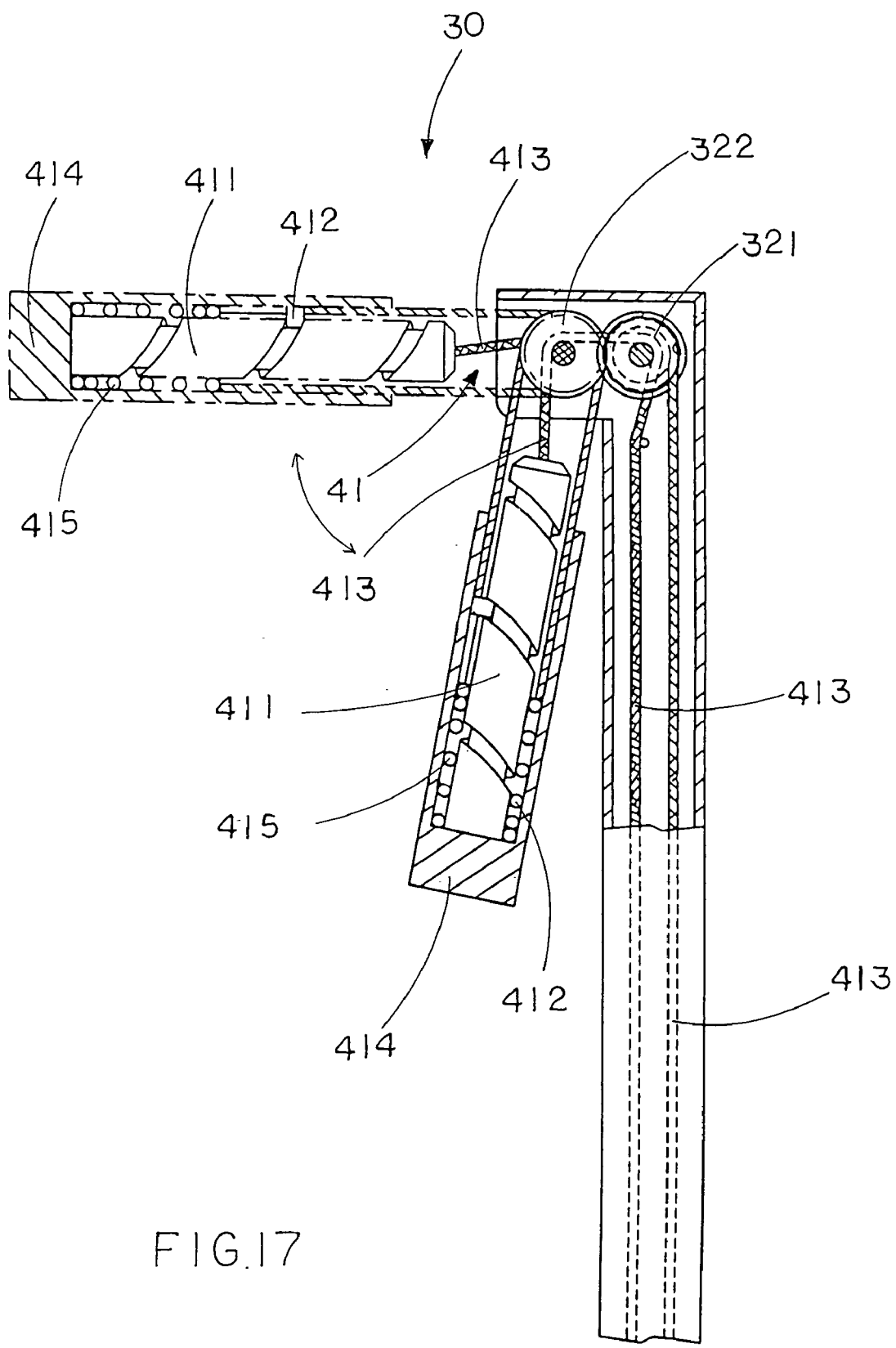
FIG. 17 is a schematic diagram of the steering unit according to the above preferred embodiment of the present invention, illustrating an interaction between the elongated steering member and one of the steering handles.

Referring to FIG. 15 and FIG. 16A to FIG. 16C of the drawings, when the circular trigger rotor 5311 continues to rotate, the first stopper head 5316 of the first steering stopper 5312 will eventually pushed out of the conveying gear 321 by the first inclined boundary wall formed on the first insertion slot 3211 of the conveying gear 321. Moreover, since the first locking latch 3212 remains engaging in the first engaging slot 5313, a further rotational movement of the circular trigger rotor 5311 will drive the conveying gear 321 to rotate in the same direction as the circular trigger rotor 5311. As a result, when the conveying gear 321 is driven to rotate, it drives the turning gears 322 to move as well, so that the respective steering handle 32 is adapted to pivotally move towards the elongated steering member 31, as shown in FIG. 17 of the drawings.

Referring to FIG. 7 of the drawings, the steering unit trigger 531 further comprises a first restoring gear 5317 and a first restoring coil 5318 coaxially mounted with the turning gear 322 within each of the steering handles 32 in such a manner that when the steering handle trigger link 5121 is relieved from actuation which turns the circular trigger rotor 5311 as mentioned above, the first restoring gear 5317 and the first restoring coil 5318 are adapted to exert a restoring force to the respective steering handle 32 so as to drive it to pivotally move back to its original position, i.e. longitudinally extended from the elongated steering member 31.

Figure 18:
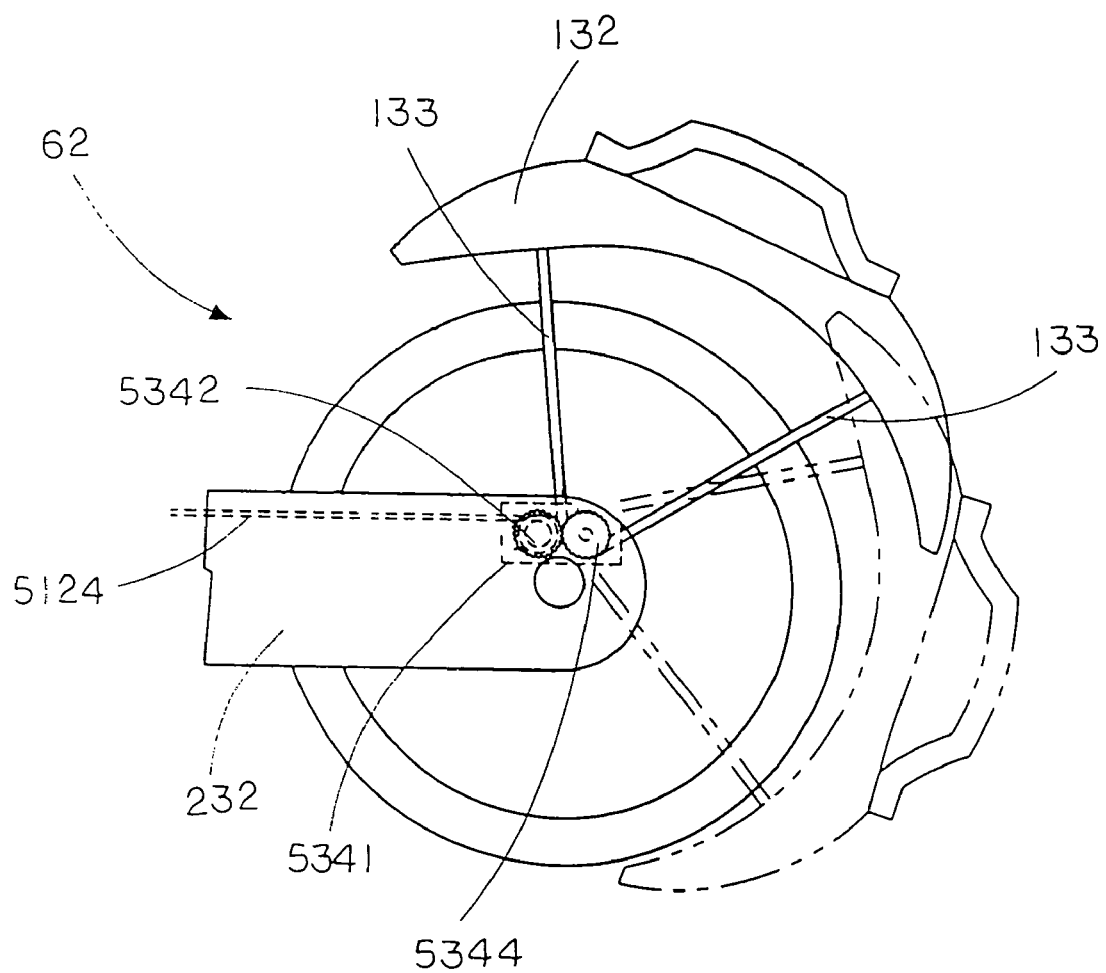
FIG. 18 is a side view of the rear enclosing cover according to the above preferred embodiment of the present invention.

Referring to FIG. 1 and FIG. 18 of the drawings, the enclosing frame 13 further comprises a rear enclosing cover 132 movably communicated with the enclosing cover trigger 534 which is mounted in the transmission device 23 of the driving unit 20, via two rear connecting rods 133.

Figure 19:
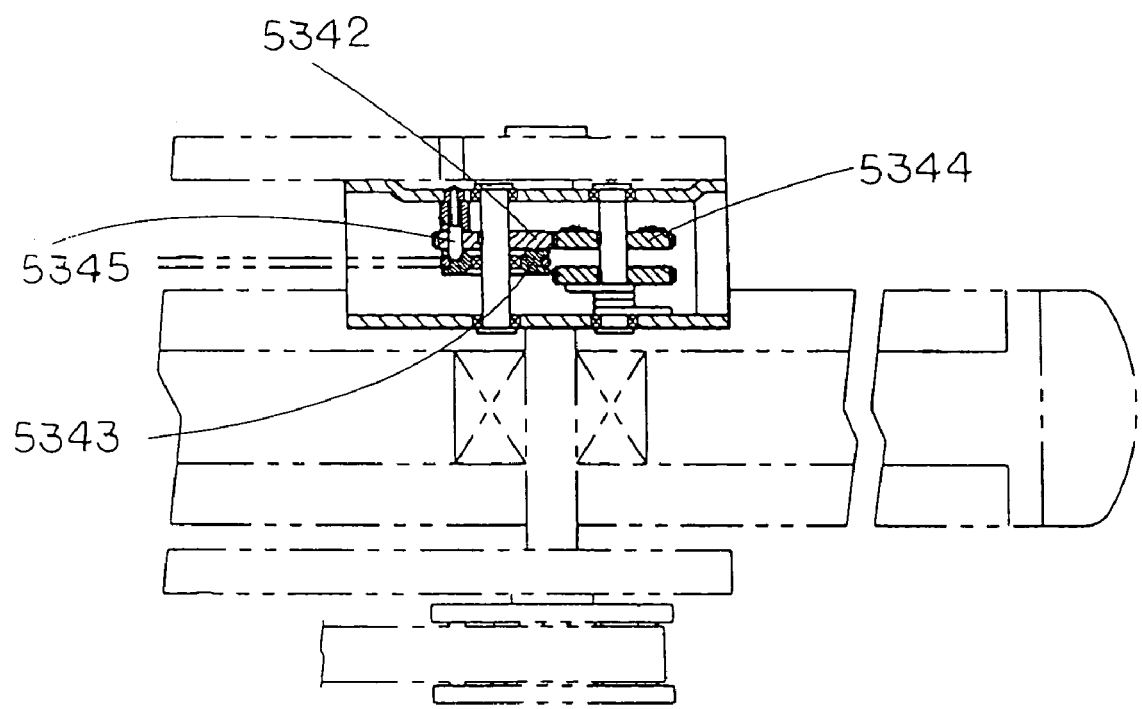
FIG. 19 is a sectional side view of the enclosing cover trigger according to the above preferred embodiment of the present invention.

Referring to FIG. 18 to FIG. 19 of the drawings, the enclosing cover trigger 534 comprises a trigger supporting frame 5341 mounted on the transmission device 23, a main trigger gear 5342 rotatably mounted in the trigger supporting frame 5341, an cover trigger rotor 5343, having a rotor slot indently and peripherally formed thereon for mounting with the enclosing cover trigger link 5124, coaxially mounted with the main trigger gear 5342, a rear cover rotary gear 5344 engaging with the main trigger gear 5342 so as to be driven thereby, and a second steering stopper 5345 penetrably mounted on the main trigger gear 5342 and the cover trigger rotor 5343 for controlling a lateral rotational movement of the main trigger gear 5342 as well as the cover trigger rotor 5343.

According to the preferred embodiment, the cover trigger rotor 5343 is similar to the circular trigger rotor 5311 so that the cover trigger rotor 5343 further has a second engaging slot defining a second inclined sidewall in a second pusher end thereof, formed thereon whereas the main trigger gear 5342 has a second insertion slot, defining a second inclined boundary wall, formed thereon which is substantially aligned with the second engaging slot 5313.

Furthermore, the main trigger gear 5342 further has a second locking latch outwardly protruded therefrom for inserting into the second engaging slot of the cover trigger rotor 5343.

The second steering stopper 5345 comprises a second main body, a second resilient member 5315 mounted in the second main body, and a second stopper head adapted to be slidably pushed to normally extend from the second main body by the second resilient member between the restricted position and the idle position.

With reference to FIG. 12A to FIG. 12C and FIG. 18 to FIG. 19 of the drawings, similar to the steering unit trigger, when the second steering stopper is in the restricted position, the second stopper head is fully extended from the second main body to penetrate through the second insertion slot all the way to the second pusher end of the second engaging slot wherein the second locking latch is inserted into another end of the second engaging slot, in such a manner that a lateral movement between the cover trigger rotor 5343 and the main trigger gear 5342 is substantially blocked.

It is also worth mentioning that since the rear cover rotary gear 5344 is engaged with the main trigger gear 5342, therefore, where the main trigger gear 5342 is locked in movement, the rear cover rotary gear 5344 is also locked in position by the main trigger gear 5342 so as to retain the rear enclosing cover 132 in position with respect to the rear wheel assembly 62.

With referring to FIG. 13, FIG. 14A to FIG. 14C, FIG. 18 to FIG. 19 of the drawings, when the second steering stopper is in the unrestricted position, the second stopper head is retracted from the second engaging slot by rotating the cover trigger rotor 5343 in such a manner that the second inclined sidewall of second engaging slot is adapted to rearwardly push the second stopper head disengaging with the second engaging slot and received in the second insertion slot of the main trigger gear 5342. Note that the rotation of the cover trigger rotor 5343 is actuated by the enclosing cover trigger link 5124.

When the cover trigger rotor 5343 continues rotating, the second locking latch will ultimately reach the second pusher end of the second engaging slot. However, it is important to mention that a length of the second locking latch is embodied as longer than that of the second stopper head such that the second inclined sidewall is incapable of pushing out the second locking latch, such as similar to those as shown in FIG. 14C of the drawings.

With reference to FIG. 15 and FIG. 16A to FIG. 16C, and FIG. 18 to FIG. 19 of the drawings, when the cover trigger rotor 5343 continues to rotate, the second stopper head of the second steering stopper will eventually pushed out of the main trigger gear 5342 by the second inclined boundary wall formed on the second insertion slot of the main trigger gear 5343.

Moreover, since the second locking latch remains engaging in the second engaging slot, a further rotational movement of the cover trigger rotor 5343 will drive the main trigger gear 5342 to rotate in the same direction as the cover trigger rotor 5343. As a result, when the main trigger gear 5342 is driven to rotate, it drives the rear cover rotary gear 5344 move as well, so that the rear enclosing cover 132 is adapted to pivotally move to enclose the main frame 11 of the foldable bicycle 1 so as to fold the foldable bicycle into the folded position.

With reference to FIG. 7 of the drawings, and referring to FIG. 19, the enclosing cover trigger 534 further comprises a second restoring gear 5346 and a restoring coil 5347 coaxially mounted with the rear cover rotary gear 5344 the trigger supporting frame 5341 in such a manner that when the enclosing cover trigger link 5124 is relieved from actuation which turns the cover trigger rotor 5343 as mentioned above, the second restoring gear 5346 and the second restoring coil 5347 are adapted to exert a restoring force to the rear enclosing cover 132 so as to drive it to pivotally move to cover the main frame 11.

Figure 20:
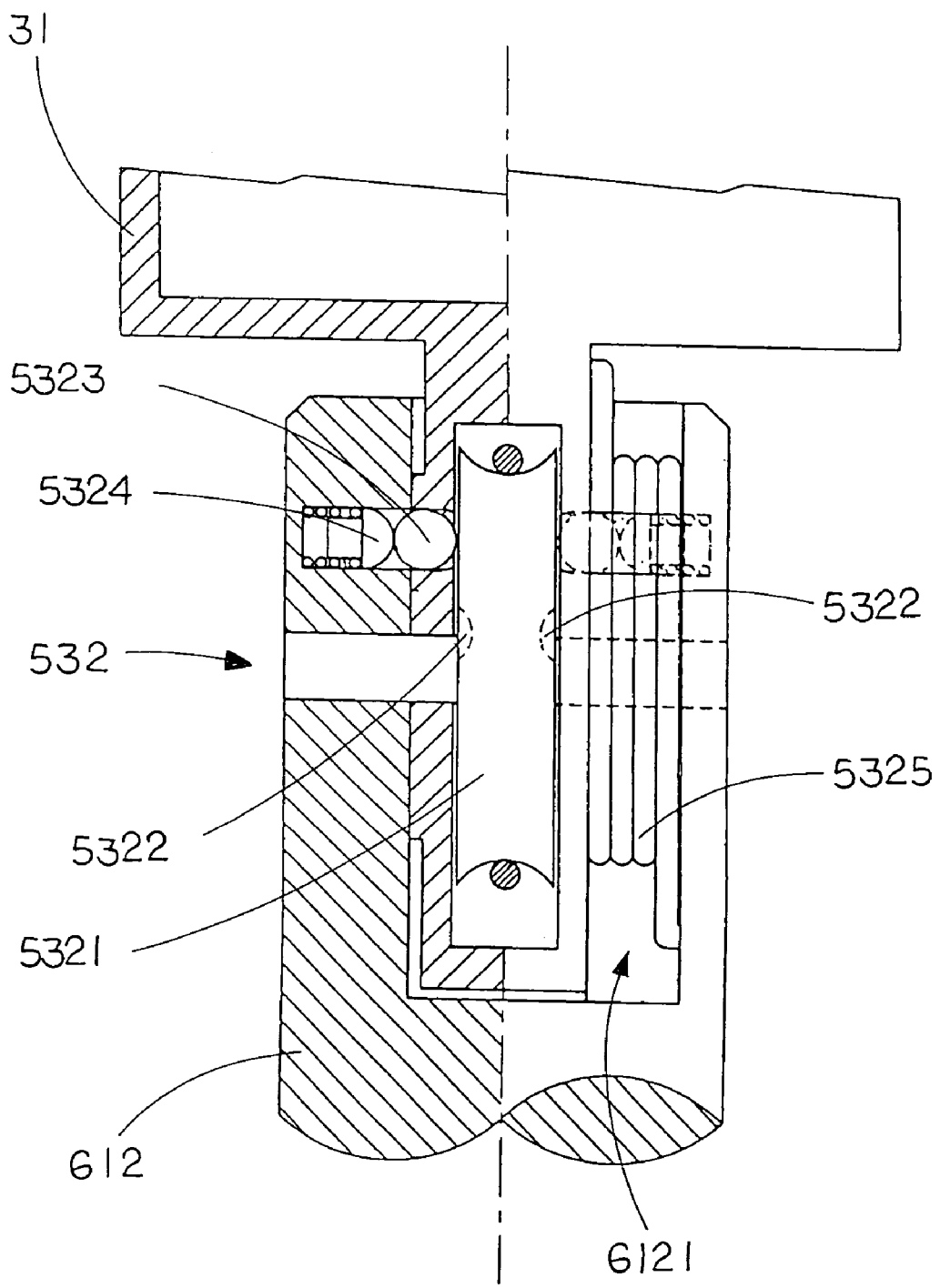
FIG. 20 is a sectional side view of the steering member trigger according to the above preferred embodiment of the present invention.
Figure 21:
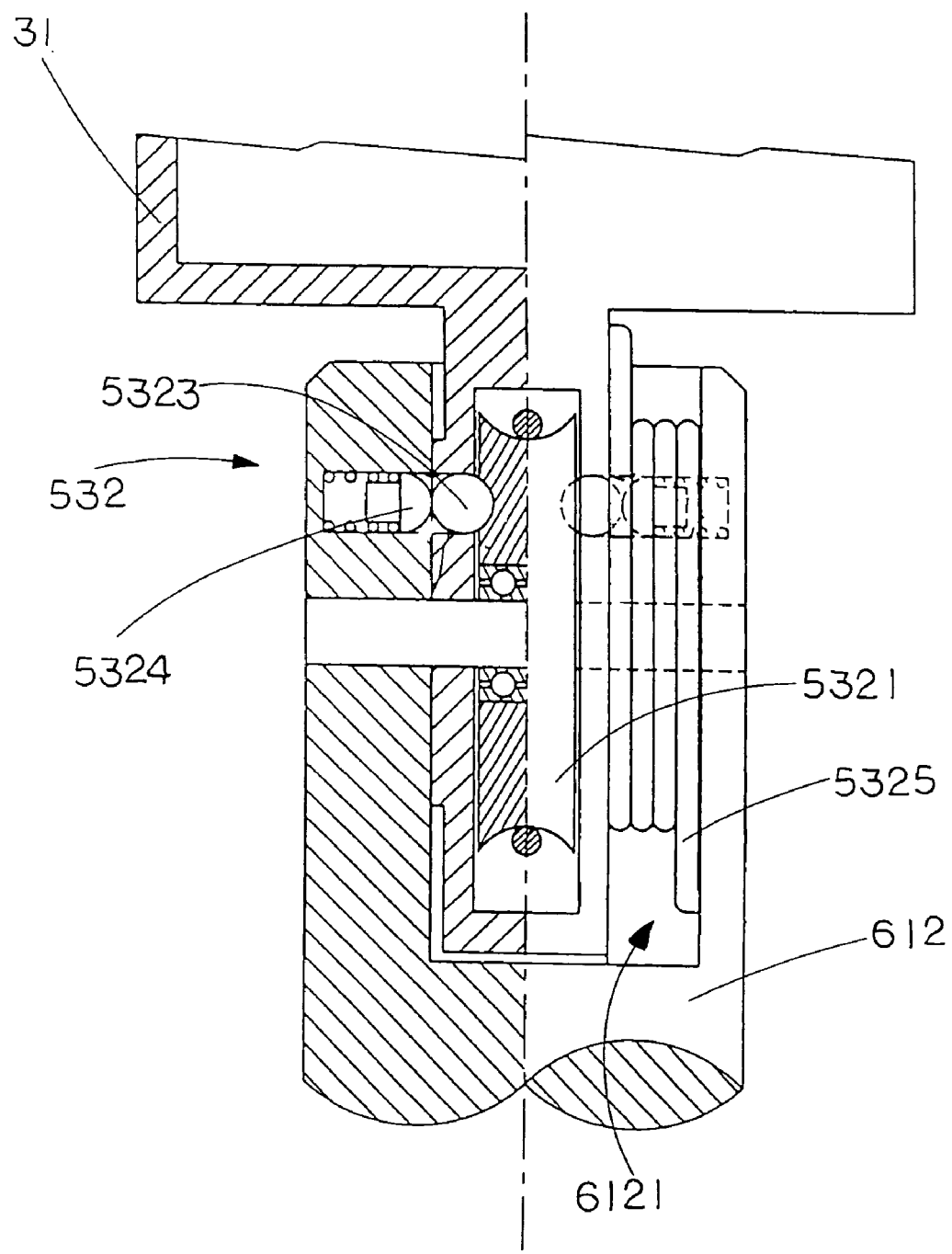
FIG. 21 is a sectional side view of the steering member trigger according to the above preferred embodiment of the present invention.

Referring to FIG. 1, FIG. 20 to FIG. 21 of the drawings, the front wheel assembly comprises a front wheel holder 611 for rotatably mounting a front wheel 612 thereon, and a wheel folding hinge 612 movably connecting the front wheel holder 611 and the elongated steering member 31, wherein the wheel folding hinge 612 has a first operation groove 6121 indently formed on a top surface thereof for connecting with the elongated steering member 31 in a pivotally movable manner. Accordingly, the elongated steering member 31 further has a bottom connecting portion adapted to movably mount in the first operation groove 6121 of the wheel folding hinge 612. Furthermore, the bottom connecting portion of the elongated steering member 31 has a first trigger slot formed therein for mounting the steering unit trigger.

According to the preferred embodiment, the wheel folding hinge 612 further has two first aligned receiving slots indently and transversely formed on two sidewalls of the first operation groove 6121 and communicated with the first trigger slot of the elongated steering member 31.

The steering unit trigger further comprises a steering member trigger 532 which is mounted in the first trigger slot of the elongated steering member 31 and the wheel folding hinge 612, wherein the steering member trigger 532 comprises a first steering trigger rotor 5321, having two first locking indents 5322 formed on two sides thereof respectively, rotatably mounted in the first trigger slot and operatively linked with the steering member trigger link 5122 which is then extended to the fold actuator 52.

The steering member trigger 532 further comprises two first pusher balls 5323 movably received in the two receiving slots of the wheel folding hinge 612 respectively, and two first pusher elements 5324 mounted in the two receiving slots for normally applying an inward urging force to the respective first pusher balls 5323 within the respective receiving slot. In other words, the two first pusher balls 5323 are normally pushed to bias against two sides of the first steering trigger rotor 5321 in such a manner that a rotational movement of the elongated steering member 31 with respect to the front wheel assembly 61 is substantially restricted by the two first pusher balls 5323.

Referring to FIG. 21 of the drawings, where the first steering trigger rotor 5321 is driven to rotate by an actuation force of the steering member trigger link 5122, the two first locking indents 5322 are as well rotated in such a manner that when the two first locking indents 5322 are substantially aligned with the two first receiving slots, due to the normal inward pushing force exerted to the two first pusher balls 5323 by the two first pusher elements 5324 respectively, the two pushers balls 5323 are arranged to be pushed to engage with the first locking indents 5322, thus relieving a blocking of the rotational movement of the elongated steering member 31 with respect to the front wheel assembly 61.

Figure 22:
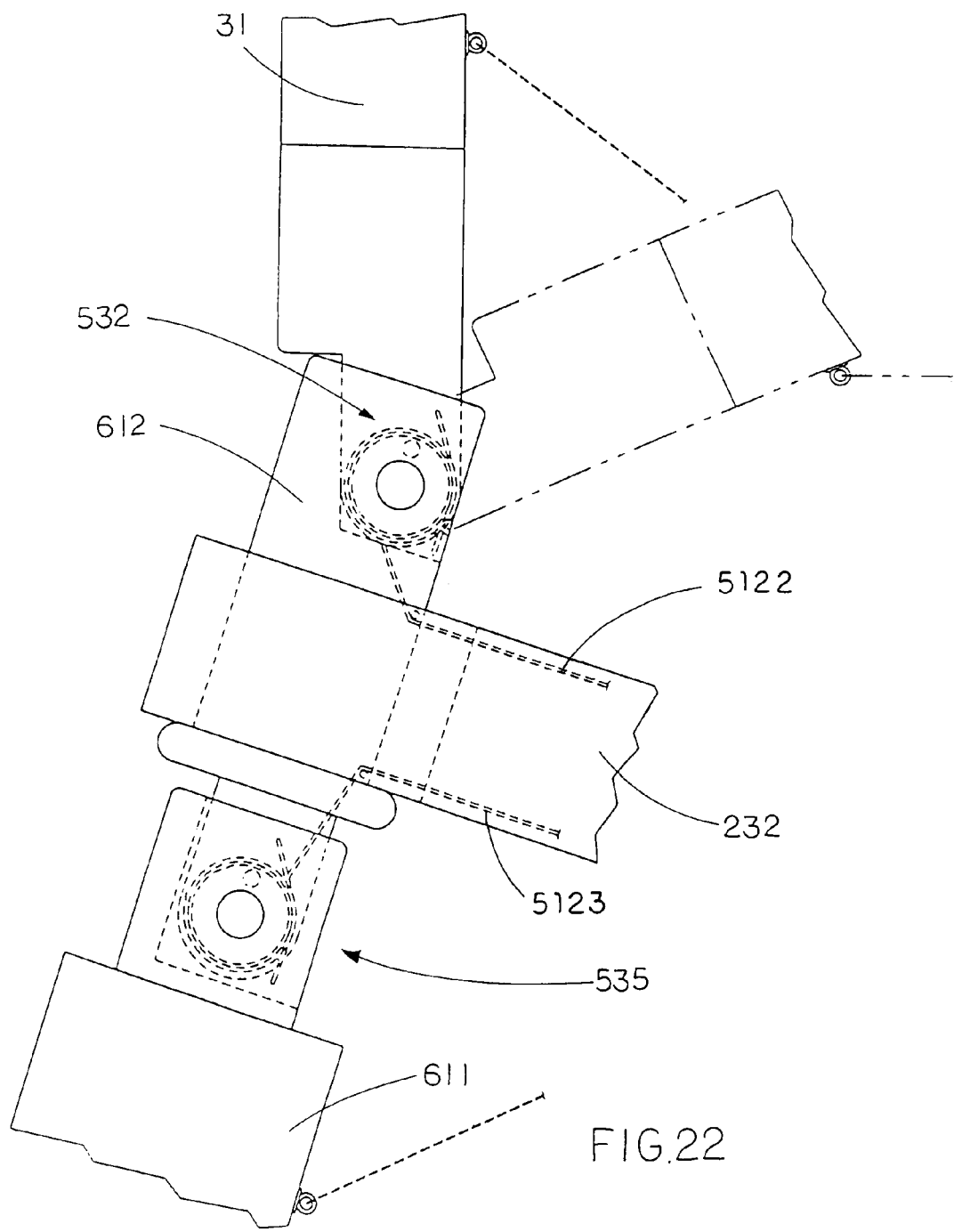
FIG. 22 is a schematic diagram of the front wheel assembly movably connecting with the elongated steering member according to the above preferred embodiment of the present invention.

As a result, referring to FIG. 4 and FIG. 22 of the drawings, when the first steering trigger rotor 5321 is driven to rotate by the steering member trigger link 5122, so as the steering folding link 5111, the elongated steering member 31 is adapted to be pivotally folded with respect to the front wheel assembly 61 so as to fold the foldable bicycle 1 into the folded position.

Moreover, the steering member trigger 532 further comprises a first retracting coil 5322 mounted in the first operation groove 6121 and adapted to normally exert a retracting force to the elongated steering member 31 for retaining it in a the unfolded position. As result, when the steering member trigger link 5122 and the steering folding link 5111 are relieved from actuation, the first retracting coil 5322 is arranged to restore the elongated steering member to the unfolded position.

Figure 23:
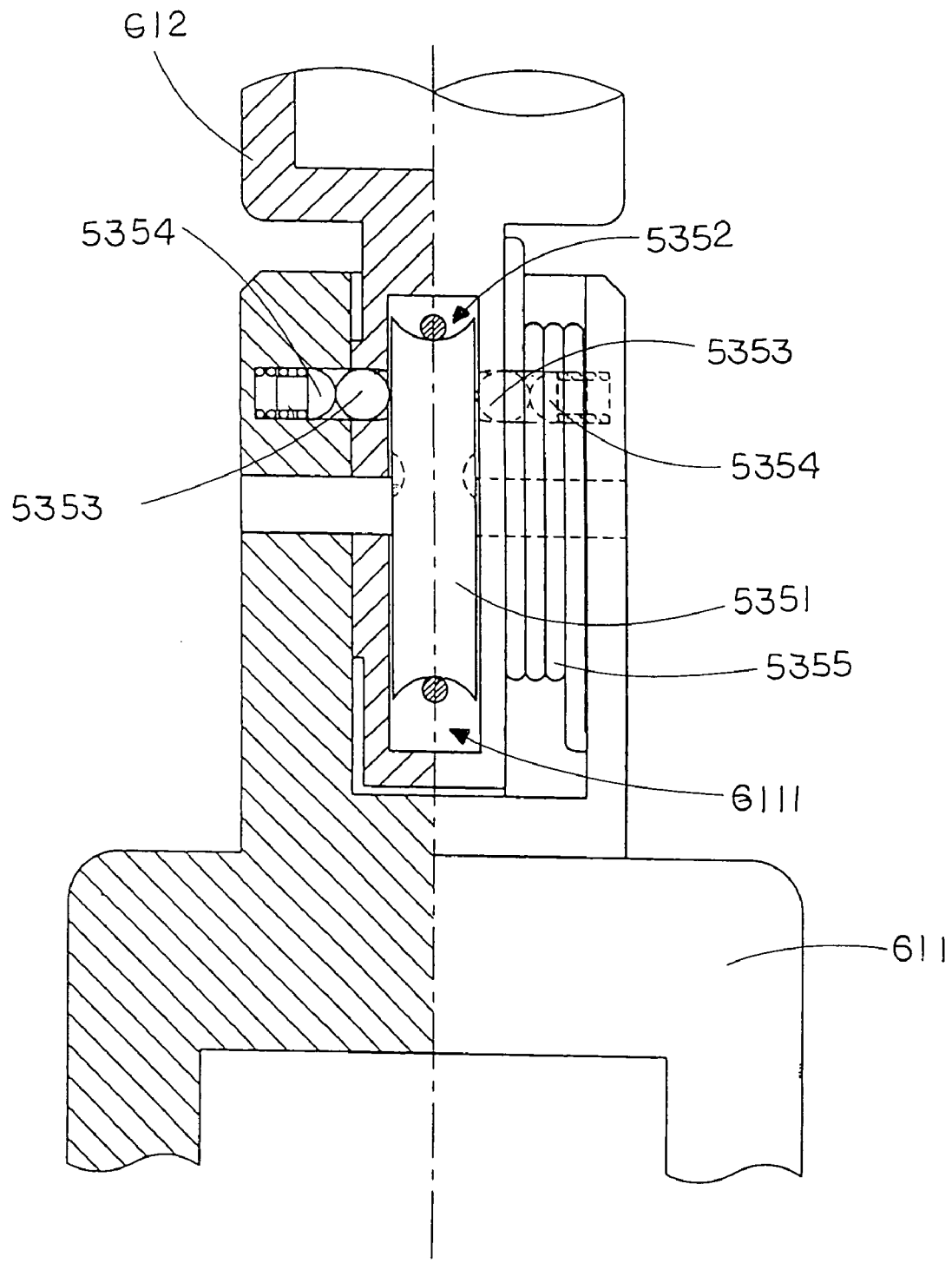
FIG. 23 is a sectional side view of the wheel folding hinge according to the above preferred embodiment of the present invention.

Referring to FIG. 22 and FIG. 23 of the drawings, in order to facilitate a folding operation of the front wheel assembly 61 so that the foldable bicycle 1 is capable of folding into the folded position, the front wheel holder 611, which is adapted to connect with a front wheel, further has a second operation groove 6111 indently formed on a top surface thereof for connecting with the wheel folding hinge 612 in a pivotally movable manner. Accordingly, the wheel folding hinge 612 further has a bottom coupling portion adapted to movably mount in the second operation groove 6111 of the front wheel holder 611. Furthermore, the bottom coupling portion of the wheel folding hinge 612 has a second trigger slot formed therein for mounting the front wheel trigger 535 which is embodied as similar to the steering member trigger 532.

According to the preferred embodiment, the front wheel holder 611 further has two second aligned receiving slots indently and transversely formed on two sidewalls of the second operation groove 6111 and communicated with the second trigger slot of the wheel folding hinge 612.

The front wheel trigger 535 comprises a second steering trigger rotor 5351, having two second locking indents 5352 formed on two sides thereof respectively, rotatably mounted in the second trigger slot and operatively linked with the front wheel folding link 5125 which is then extended to the fold actuator 52.

The front wheel trigger 535 further comprises two second pusher balls 5353 movably received in the two second receiving slots of the front wheel holder 611 respectively, and two second pusher elements 5354 mounted in the two second receiving slots for normally applying an inward urging force to the respective second pusher balls 5353 within the respective second receiving slot. In other words, the two second pusher balls 5353 are normally pushed to bias against two sides of the second steering trigger rotor 5351 in such a manner that a rotational movement of the wheel folding hinge 612 with respect to the front wheel holder 611 is substantially restricted by the two second pusher balls 5353.

Referring to FIG. 23 of the drawings, where the second steering trigger rotor 5351 is driven to rotate by an actuation force of the front wheel trigger link 5125, the two second locking indents 5352 are as well rotated in such a manner that when the two second locking indents 5352 are substantially aligned with the two second receiving slots, due to the normal inward pushing force exerted to the two second pusher balls 5353 by the two second pusher elements 5354 respectively, the two pushers balls 5353 are arranged to be pushed into the second locking indents 5352, thus relieving a blocking of the rotational movement of the wheel folding hinge 612 with respect to the front wheel holder 611.

As a result, referring to FIG. 22 of the drawings, when the second steering trigger rotor 5351 is driven to rotate by the front wheel trigger link 5125, so as the front wheel folding link 5112, the wheel folding hinge 612 is adapted to be pivotally folded with respect to the front wheel holder 611 so as to fold the foldable bicycle 1 into the folded position.

Moreover, the front wheel trigger 535 further comprises a second retracting coil 5355 mounted in the second operation groove 6121 and adapted to normally exert a retracting force to the wheel folding hinge 612 for retaining it in the unfolded position. As result, when the front wheel trigger link 5125 and the front wheel folding link 5112 are relieved from actuation, the second retracting coil 5355 is arranged to restore the elongated steering member to the unfolded position.

As a result, as shown in FIG. 22 of the drawings, when the folding arrangement 50 is actuated to fold the foldable bicycle 1 of the present invention, the front wheel holder 611 and the elongated steering member 31 are adapted to pivotally fold with towards the main frame 11 so as to form a compact structure when foldable bicycle 1 is in the folded position.

Figure 24:
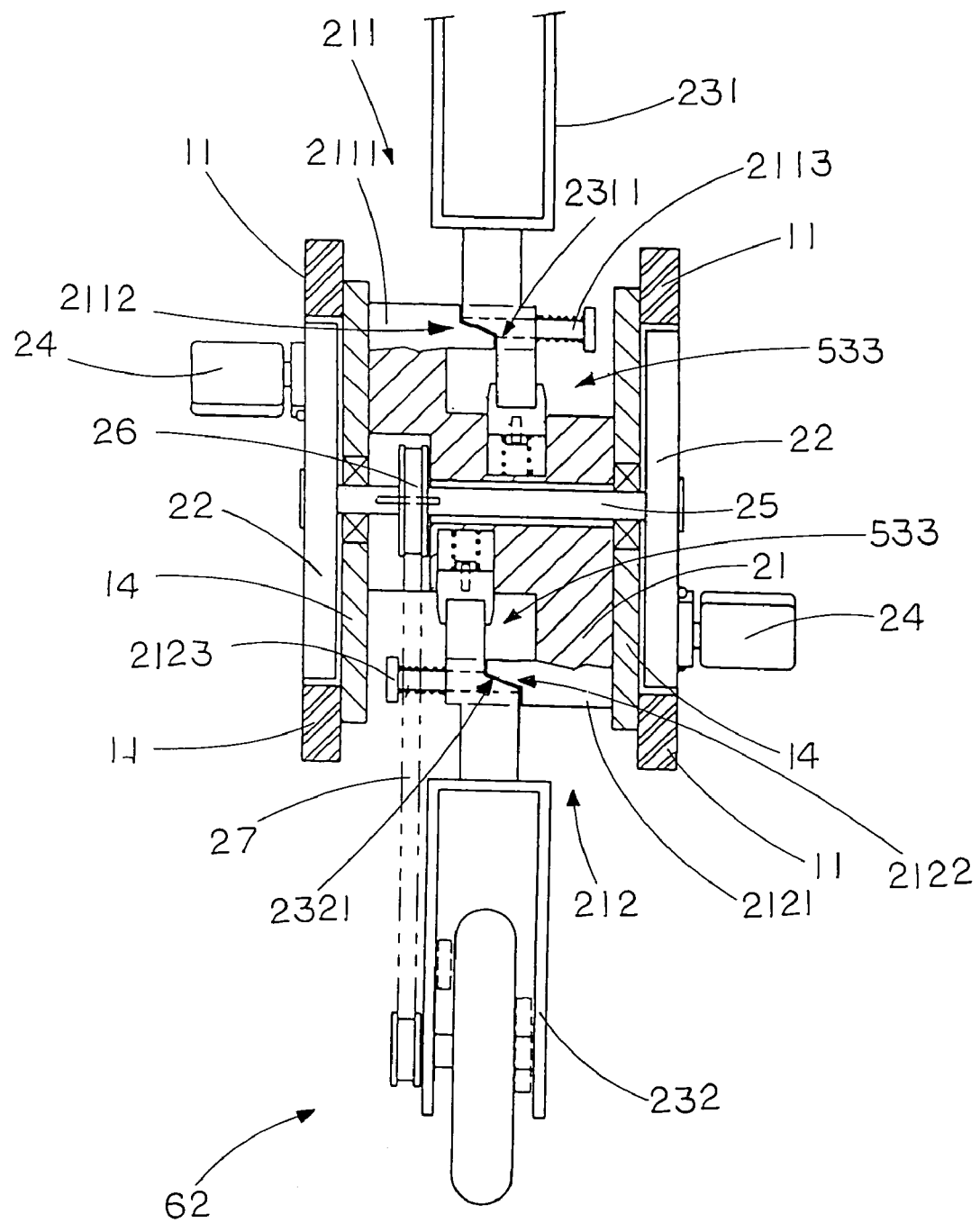
FIG. 24 is a sectional side view of the driving unit according to the above preferred embodiment of the present invention.

Referring to FIG. 24 of the drawings, the securing device 21 of the driving unit 20 is mounted in the main frame 11 wherein the two driving rotors 22 is connected with each other via a driving axle 25 rotatably mounted across the main frame 11. The driving unit 20 further comprises a dynamic gear 26 mounted on the driving axle 25 in such a manner that when the driving rotors 22 rotate, the dynamic gear 26 is driven to rotate as well.

Moreover, the driving unit 20 further comprises a transmission belt 27 operatively communicating the dynamic gear 26 and the rear wheel assembly 62 for transmitting a rotational movement of the driving axle 25 to the rear wheel assembly 62 so as to drive the foldable bicycle 1 to move. Furthermore, the transmission device 23 comprises a front sustaining member 231 and a rear sustaining member 232 movably connected with the front sustaining member 231 via the securing device 21.

Figure 25:
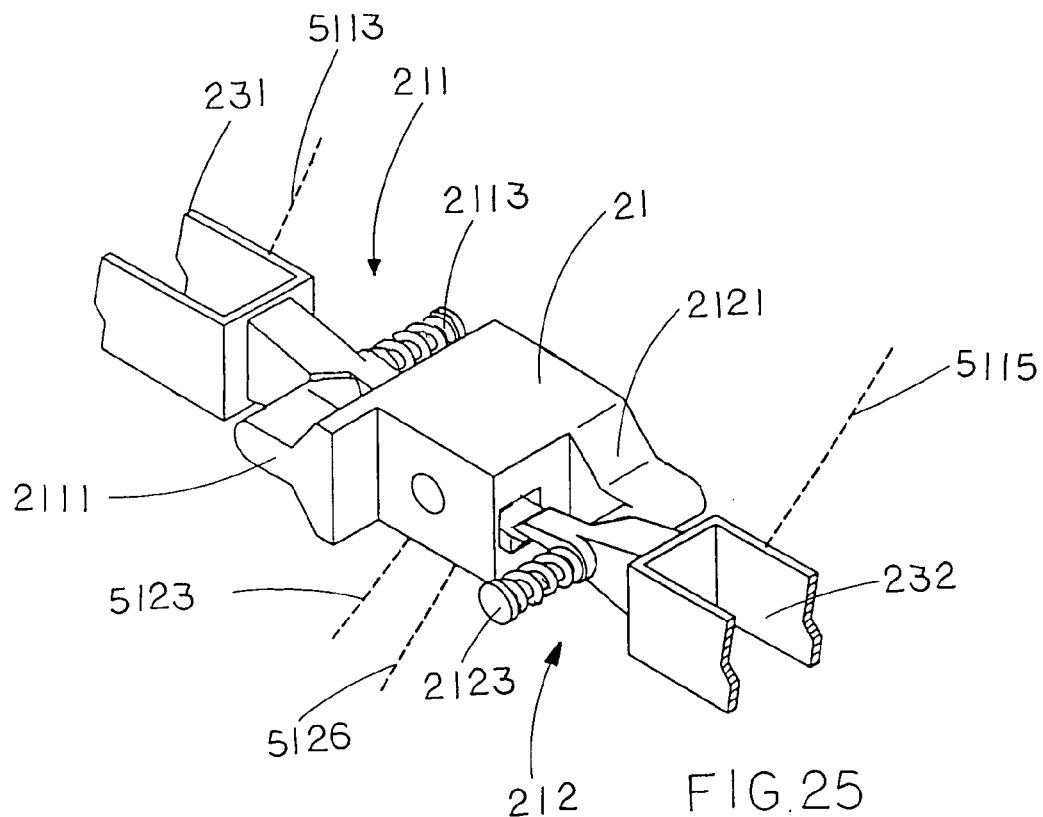
FIG. 25 is a perspective view of the securing device according to the above preferred embodiment of the present invention.

Referring to FIG. 24 and FIG. 25 of the drawings, the securing device 21 comprises an upper fold guider 211 which comprises a first guider housing 2111 having a first slanted surface 2112, and a first resilient axle 2113 longitudinally extended from the first slanted surface 2112. Moreover, the rear sustaining member 231 has a bottom linkage portion having a first inclined surface 2311 downwardly extended towards the securing device 21 and is arranged to correspond and align with the first slanted surface 2112 of the upper fold guider 211.

On the other hand, the securing device 21 further comprises a lower fold guider 212 which comprises a second guider housing 2121 having a second slanted surface 2122, and a second resilient axle 2114 longitudinally extended from the second slanted surface 2122.

Referring to FIG. 24 of the drawings, the rear sustaining member 23 has an upper linkage portion having a second inclined surface 2321 upwardly extended towards the securing device 21 and is arranged to correspond and align with the second slanted surface 2122 of the lower fold guider 212.

Referring to FIG. 24 to FIG. 25 of the drawings, the driving unit trigger 533 is supported by the securing device 21 wherein the upper linkage portion of the rear sustaining member 232 and the bottom linkage portion of the front sustaining member 231 are communicated with the driving unit trigger 533.

Figure 26:
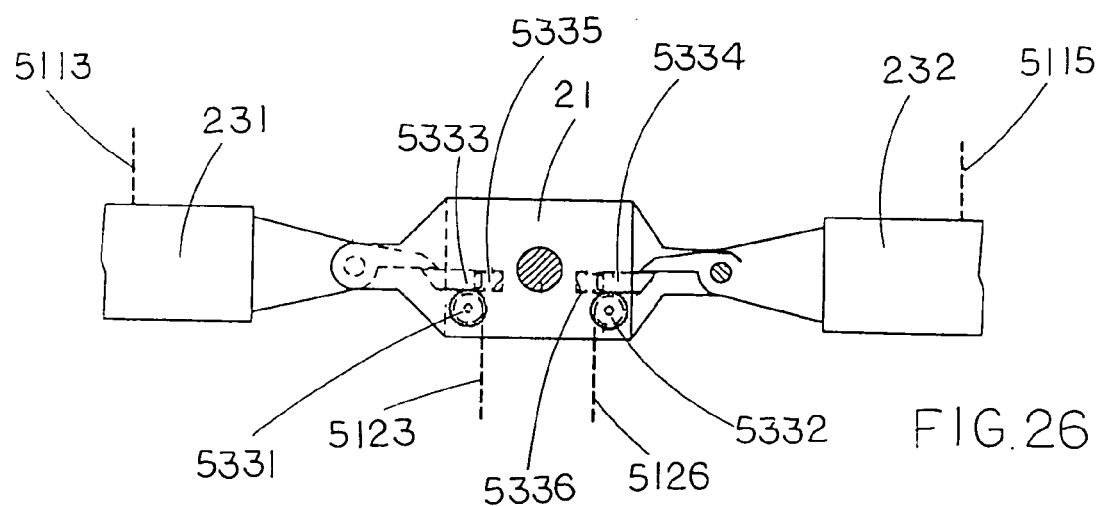
FIG. 26 is a sectional side view of the securing device according to the above preferred embodiment of the present invention.

Referring to FIG. 26 of the drawings, the driving unit trigger 533 comprises a first and a second supporting gear 5331, 5332 whereas the driving trigger link comprises a first drive trigger link 5123 and a second drive trigger link 5126 movably engaged on the first and the second supporting gears 5331, 5332 which are arranged to be driven to rotate by a respective pulling force applied on the first and the second drive trigger link 5123, 5126 by the auxiliary fold actuator 53.

Furthermore, the driving unit trigger 533 further comprises a first and a second blocking member 5333, 5334 movably mounted in the securing device 21 and are engaged with the first and the second supporting gears 5331, 5332. Moreover, the first and the second blocking member 5333, 5334 are extended out of the securing device 21 to communicate with the upper linkage portion of the rear sustaining member 232 and the bottom linkage portion of the front sustaining member 231 respectively in such a manner that the first and the second blocking member 5333, 5334 are adapted to normally block a pivotal movement of the front sustaining member 231 and the rear sustaining member 232 about the first and the second resilient axle 2113, 2114 respectively.

However, when the first and the second drive trigger link 5123, 5126 is actuated so as to be pulled for rotating the first and the second supporting gears 5331, 5332, the first and the second blocking member 5333, 5334 are arranged to be driven to inwardly move towards the securing device 21 so as to release a blocking of the pivotal movement of the front sustaining member 231 and the rear sustaining member 232 with respect to the securing device 21 about the first and the second resilient axle 2113, 2114.

Figure 27:
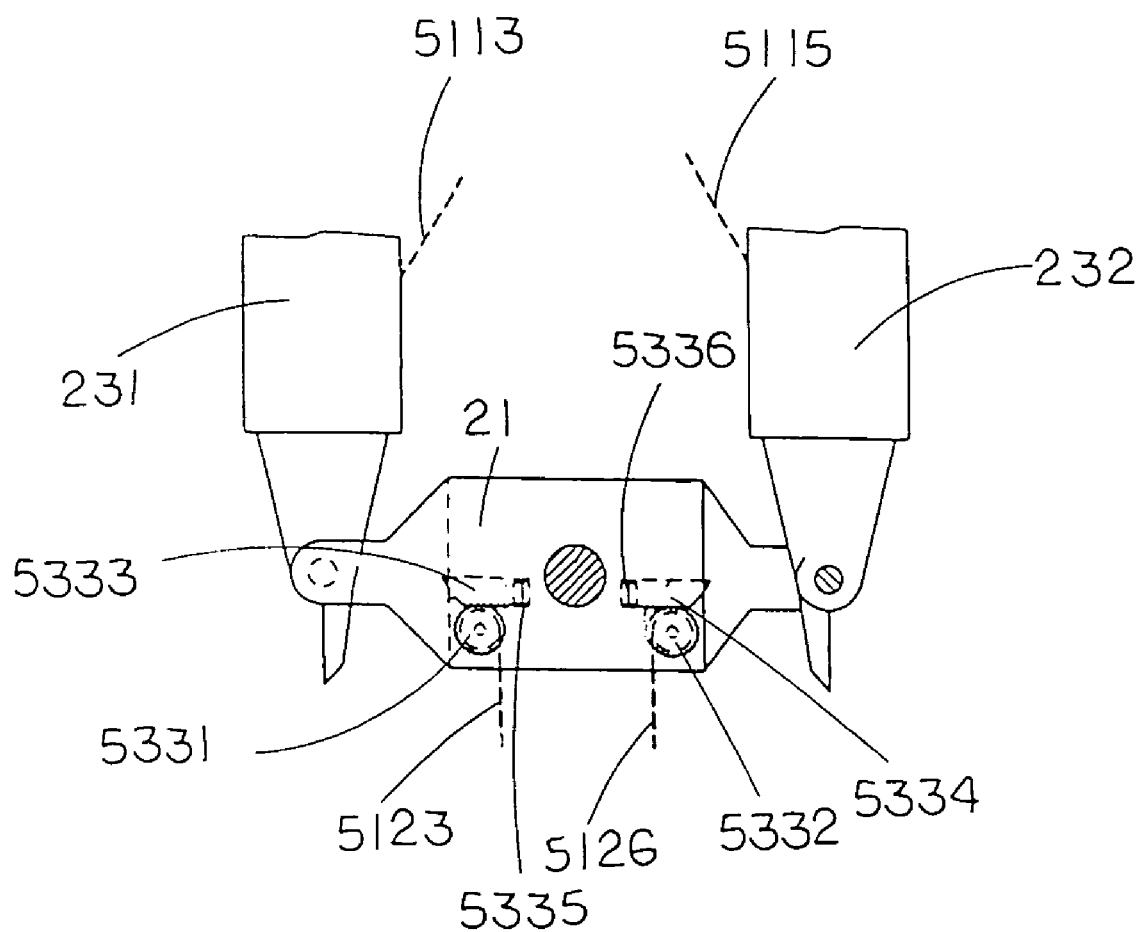
FIG. 27 is a schematic diagram of the driving unit according to the above preferred embodiment of the present invention, illustrating that the sustaining member and the rear wheel holder are capable of pivotally moving with respect to the securing device.
Figure 28:
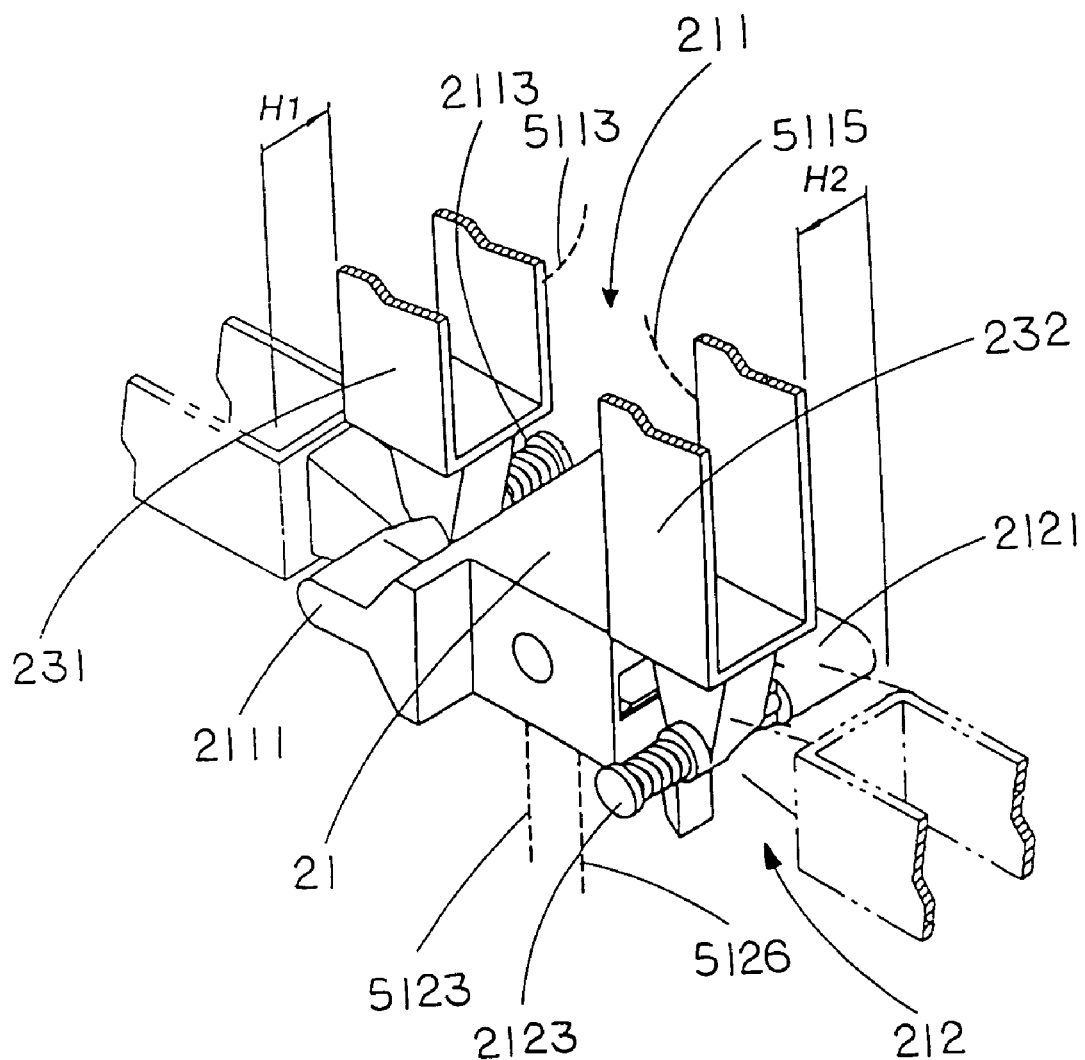
FIG. 28 is a perspective view of the driving unit according to the above preferred embodiment of the present invention, illustrating that the sustaining member and the rear wheel holder are capable of pivotally moving with respect to the securing device.

As a result, as shown in FIG. 27 to FIG. 28 of the drawings, the driving folding link comprises a first and a second driving folding link 5113, 5115 extended to the first sustaining member 231 and the rear sustaining member 232 wherein when the first and the second blocking members 5333, 5334 are driven by the first and the second supporting gears 5331, 5332 for unblocking a pivotal movement of the front sustaining member 231 and the rear sustaining member 232, they are capable of pivotally moving with respect to the securing device 21 so as to be folded by the first and the second driving folding link 5113, 5115 respectively.

Figure 29:
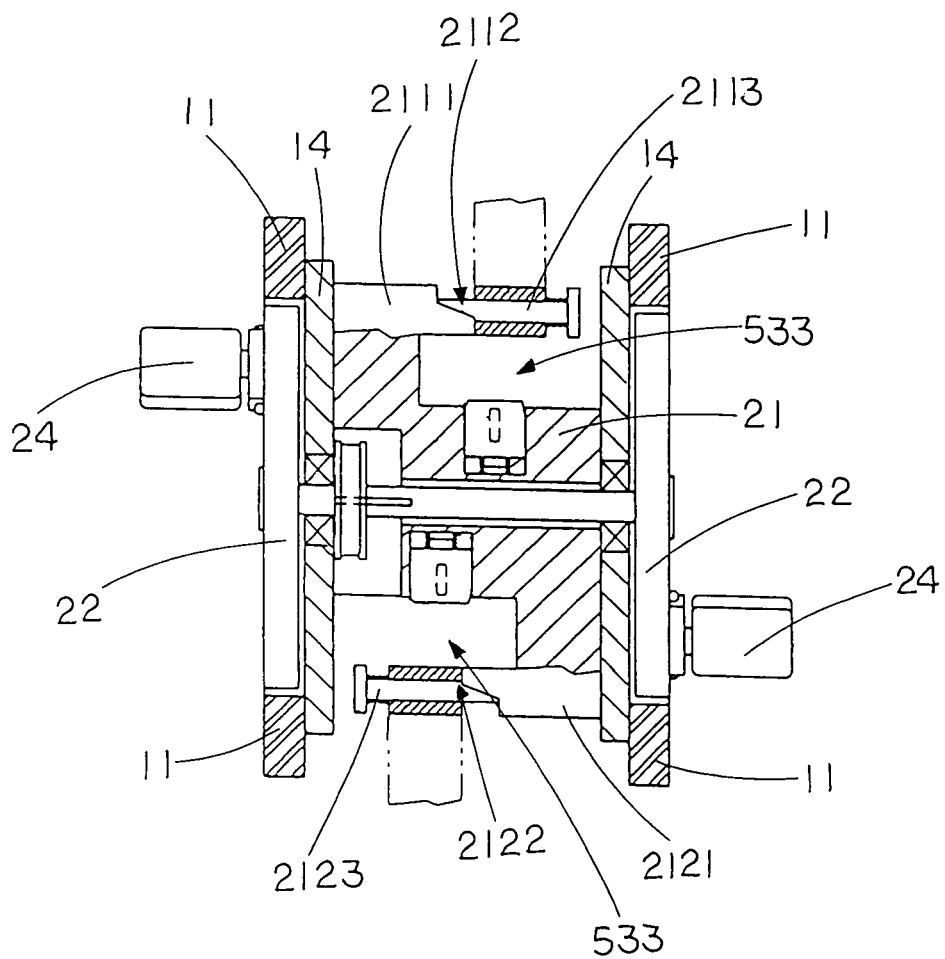
FIG. 29 is a sectional side view of the driving unit according to the above preferred embodiment of the present invention, illustrating that the sustaining member and the rear wheel holder are dis-aligned when being folded.
Figure 30:
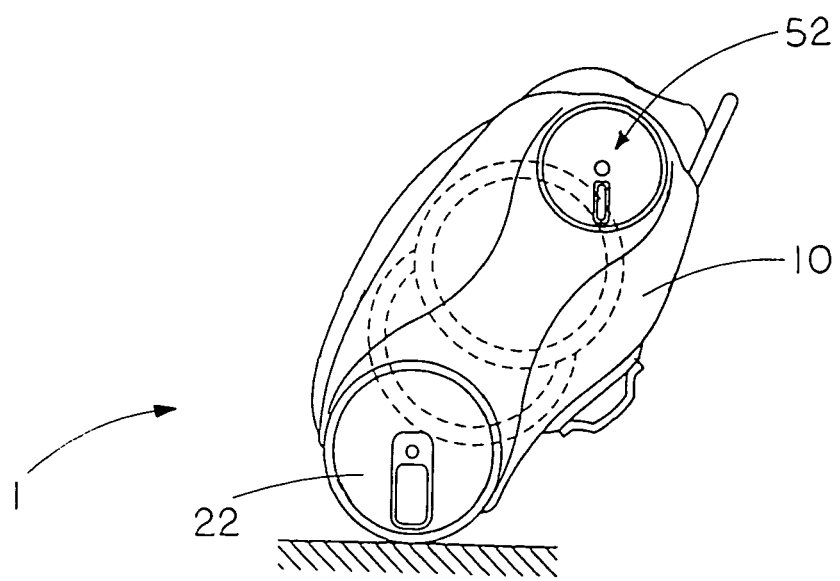
FIG. 30 is a schematic diagram of the foldable bicycle according to the above preferred embodiment of the present invention, illustrating that the driving unit is folded into the main frame.

Referring to FIG. 29 to FIG. 30 of the drawings, according to the preferred embodiment of the present invention, when the front sustaining member 231 and the rear sustaining member 232 are being folded, they are substantially guided by the first and the second slanted surface 2112, 2122 in such a manner that the front sustaining member 231 and the rear sustaining member 232 are arranged to opposedly and transversely displace by a predetermined distance 'H1' and 'H2' respectively so as to disalign with each other for foldably receiving in the main frame 11. In other words, the front sustaining member 231 and the second sustaining member 232 are adapted to be pivotally folded in a disaglined manner so as to enable them to be compactly received in the main frame 11 of the bicycle frame 10 when the foldable bicycle 1 is in the folded position.

Figure 31:
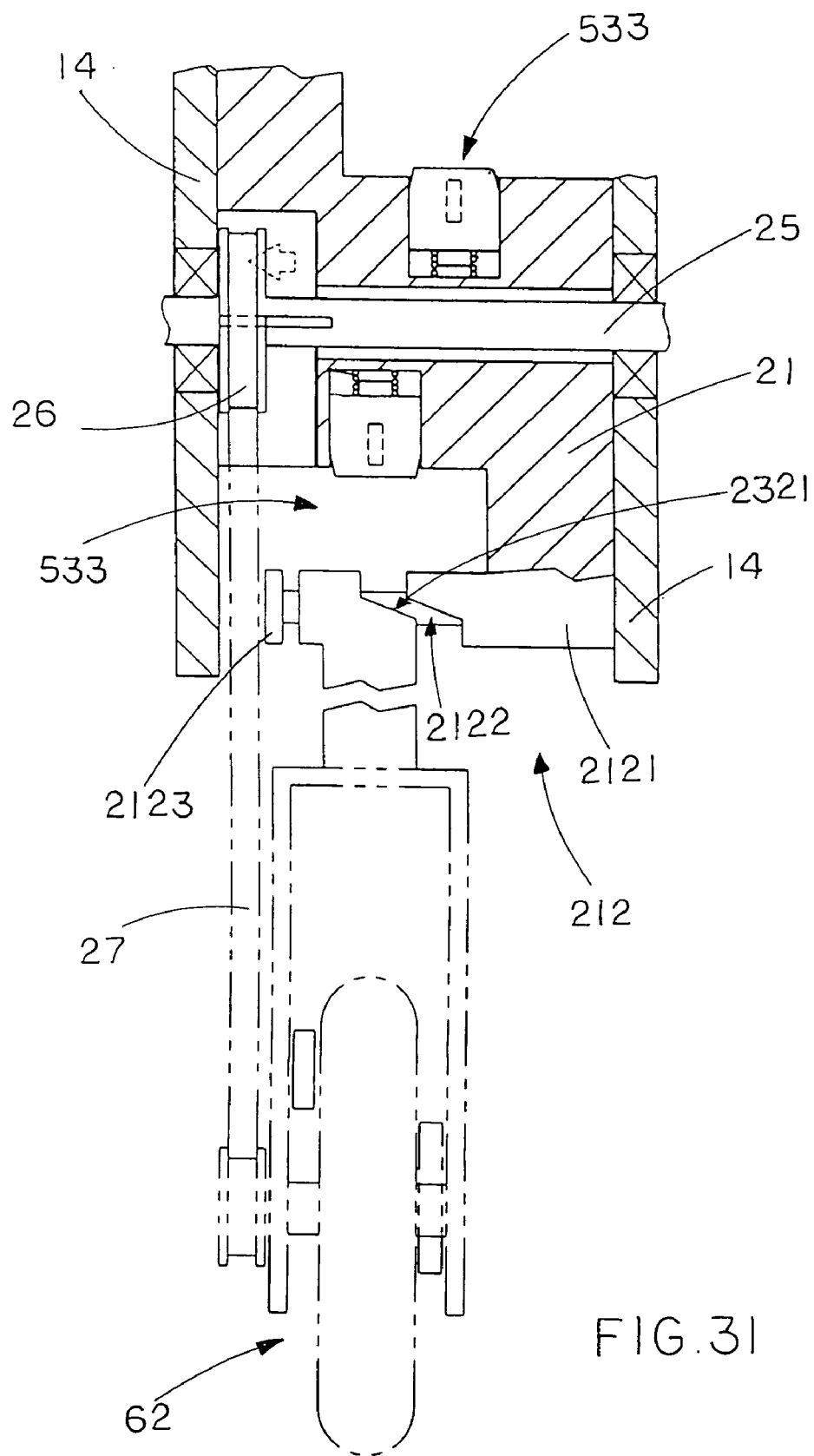
FIG. 31 is a sectional side view of the driving unit according to the above preferred embodiment of the present invention, illustrating that the dynamic gear is adapted to slidably move along an elongated slider mounted on the driving axle.

Referring to FIG. 31 of the drawings, the driving unit further comprises an elongated slider 28 mounted on the driving axle 25 wherein the dynamic gear 26 is adapted to slidably move along the elongated slider 28 when the second sustaining member 232 is folded so as to be transversely displaced as guided by the second slanted surface 2122. Accordingly, when the rear sustaining member 232 is transversely displaced during folding, the dynamic gear 26 is also arranged to be transversely displaced by sliding along the elongated slider 28.

Referring back to FIG. 24 of the drawings, the driving unit trigger 533 further comprises a first and a second resilient springs 5335, 5336 mounted in the securing device 21 and adapted to normally apply an urging force to the first and the second blocking members 5333, 5334 so as to normally push the blocking member 5333, 5334 extending out of the securing device 21 for blocking the pivotal movement of the front and the rear sustaining member 231, 232 respectively. In other words, when the first and the second drive trigger link 5123, 5126 are relieved from actuating the driving unit trigger 533, the first and the second resilient springs 5335, 5336 are adapted to push the first and the second blocking member 5333, 5334 so as to block the pivotal movement of the front and the rear sustaining member 231, 232.

Figure 32:
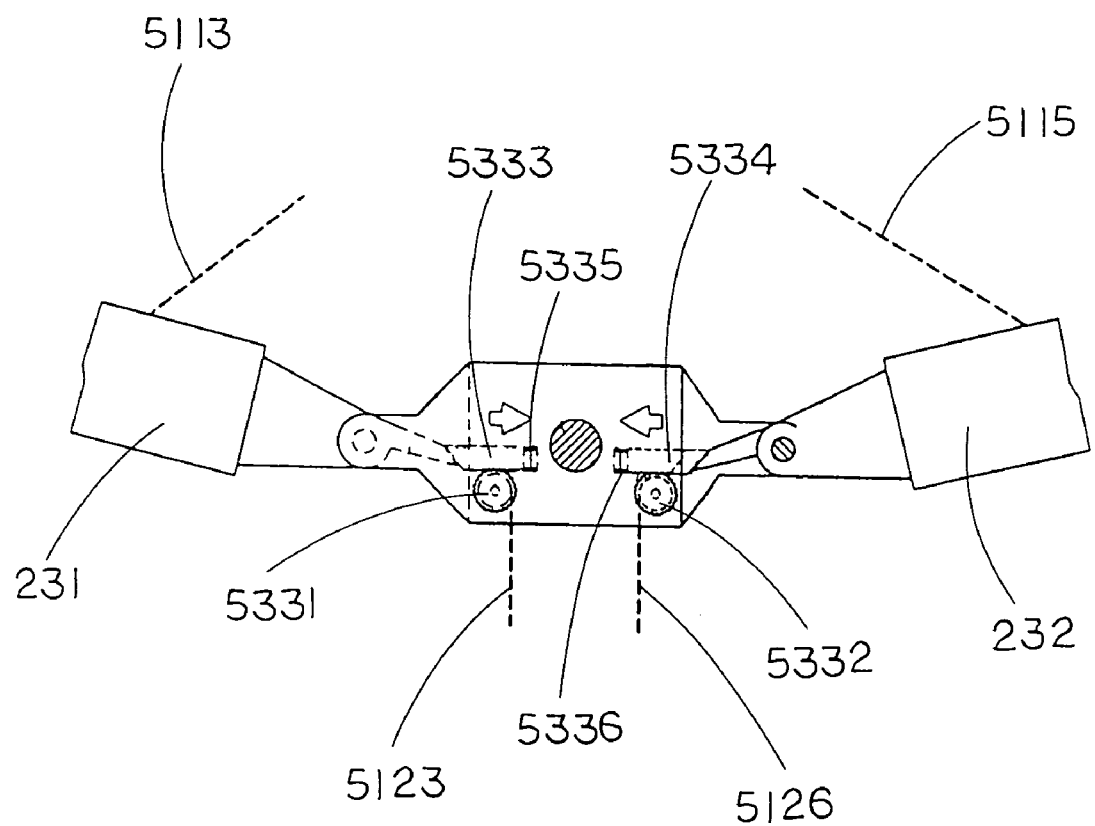
FIG. 32 is a schematic diagram of the driving unit according to the above preferred embodiment of the present invention, illustrating that the folding and unfolding mechanism of the sustaining device.

Referring to FIG. 32 of the drawings, each of the first and the second blocking member 5333, 5334 has a pushing surface formed thereon whereas the each of the bottom linkage portion of the front sustaining member 231 and the upper linkage portion of the rear sustaining member 232 has a pusher surface corresponding to the respective pushing surface in such a manner that when the fold actuator 52 and the auxiliary fold actuator 53 are relieved from actuation, the front and the rear sustaining members 231, 232, when the foldable bicycle 1 is unfolded, will by normal gravitational force be driven to pivotally move for fully extending until the pusher surface bias against the respective pushing surface, thus slightly pushing the respective blocking member 5333, 5334 to move inwardly. When the front and the second sustaining member 231, 232 continues extending, the pusher surface will pass the respective pushing surface and the resilient springs 5335, 5336 will push the respective block member 5333, 5334 extending out of the securing device 21 and block the pivotal movement of the first and the second sustaining members 231, 232, as shown in FIG. 26 of the drawings.

Referring to FIG. 33 to FIG. 35 of the drawings, each of the driving rotors 22 defines a paddle slot 221 formed thereon wherein each of the driving paddles 24 comprises two resilient latches 241 adapted to be normally and transversely extended from two sides of the driving paddle 24 which is then pivotally mounted on to the respective paddle slot 221.

When the driving paddle 24 is pivotally received in the paddle slot 221, the two resilient latches 241 are adapted bias against the two sidewalls thereof, conversely, when the driving paddle 24 is pivotally extended to transversely extended from the driving rotor 22 for being stepped by a user of the present invention, the two resilient latches 241 are arranged to transversely extend from the driving paddle 24 across the paddle slot so as to normally block a pivotal movement of the driving paddle 24. When the user wants to pivotally receive the driving paddle back 24 to the paddle slot 241, he/she may simply slightly presses the two resilient latches 241 for unblocking the pivotal movement of the driving paddle 24.

Figure 36A:
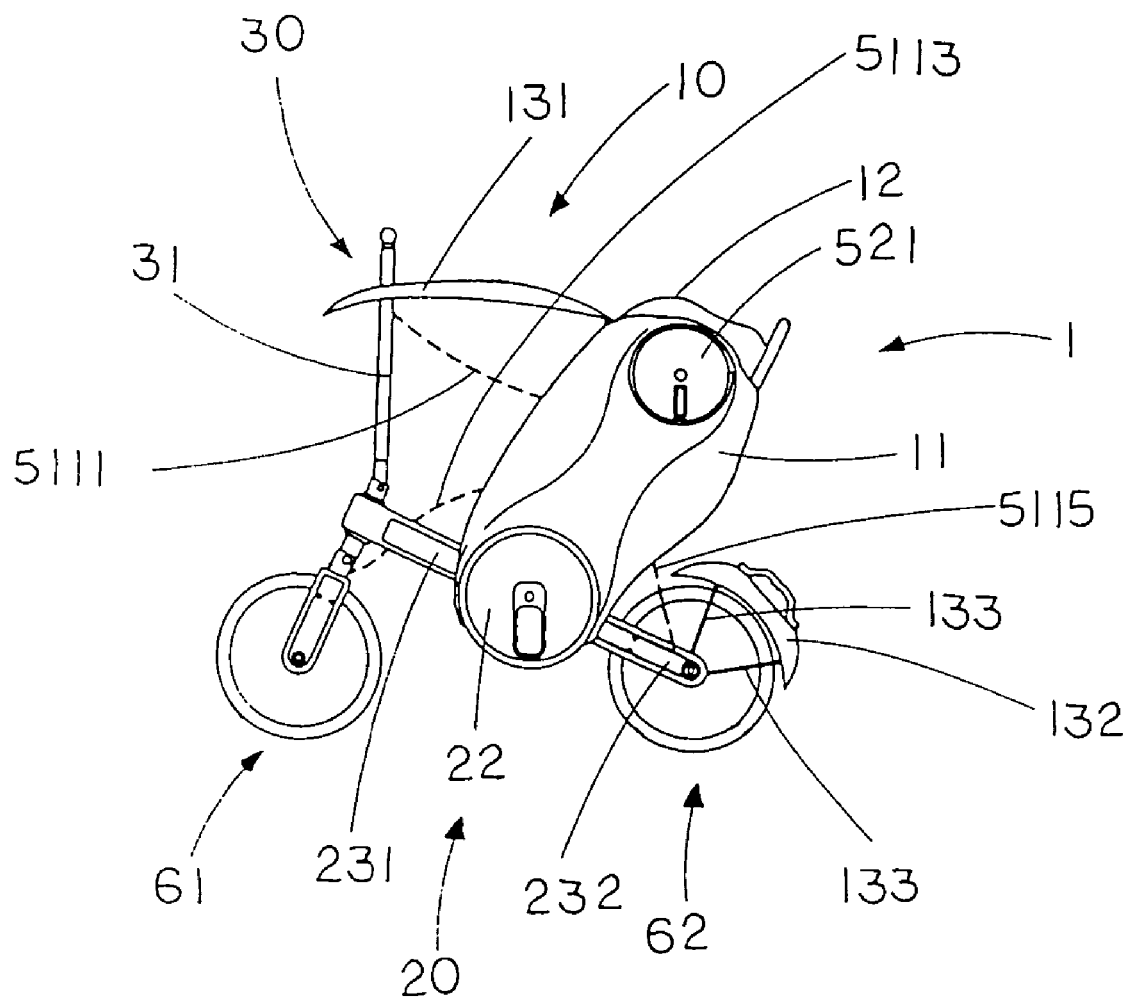
FIG. 36A to FIG. 36E are schematic diagrams of a folding operation of the foldable bicycle according to the above preferred embodiment of the present invention.
Figure 36B:
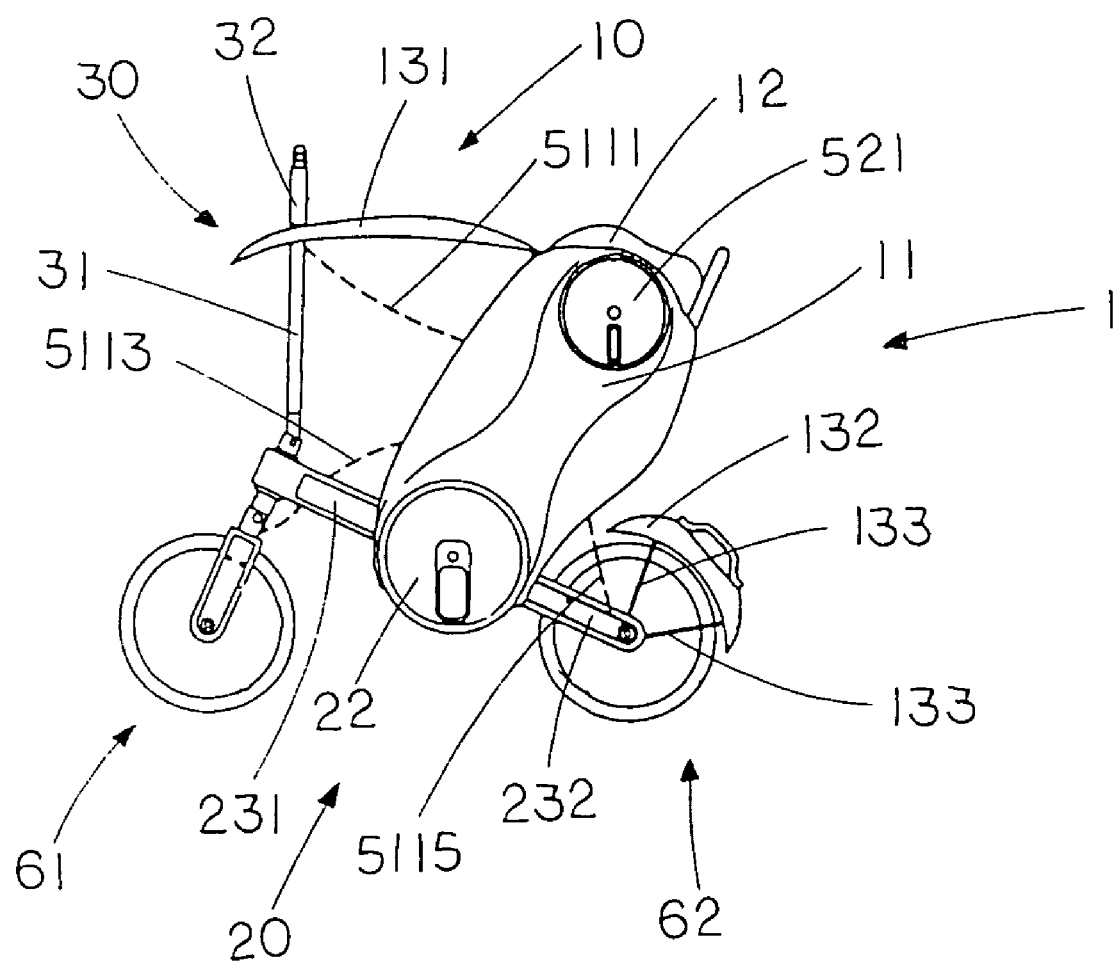
Figure 36C:
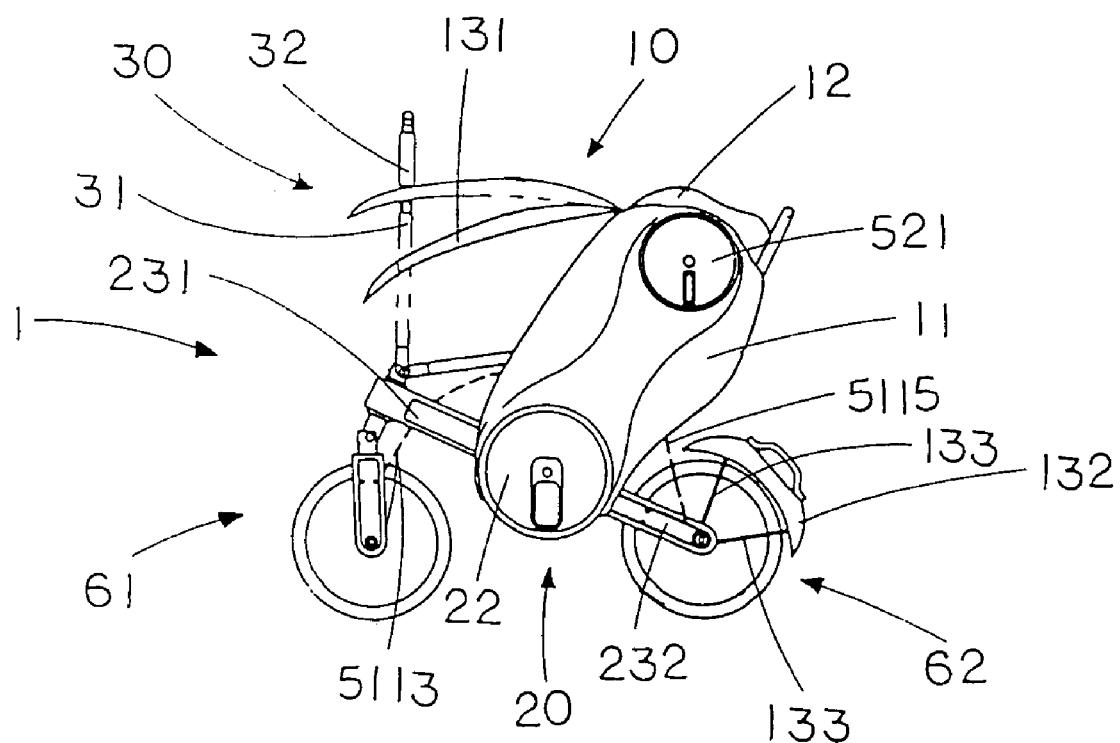
Figure 36D:
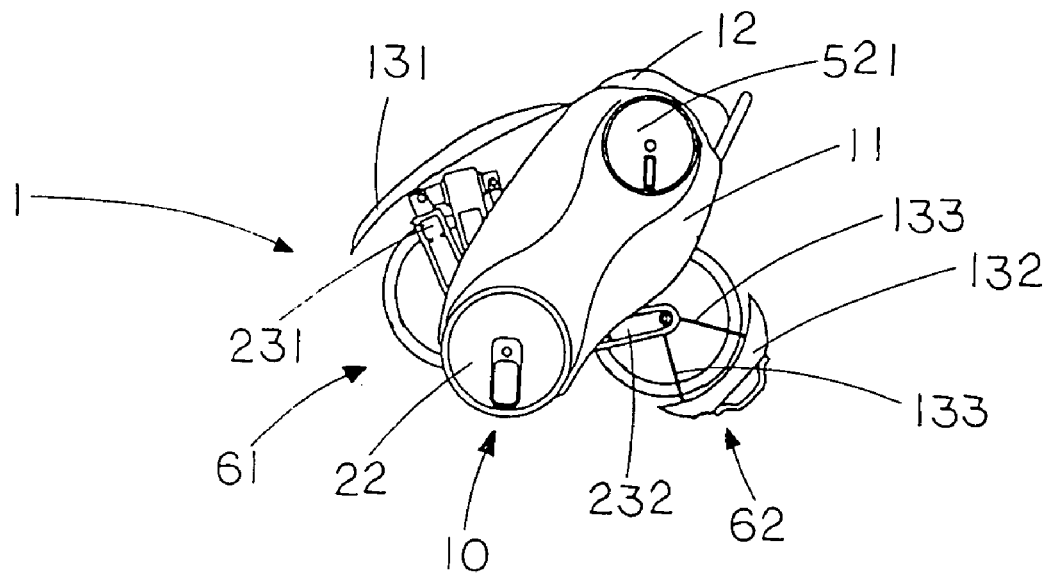
Figure 36E:
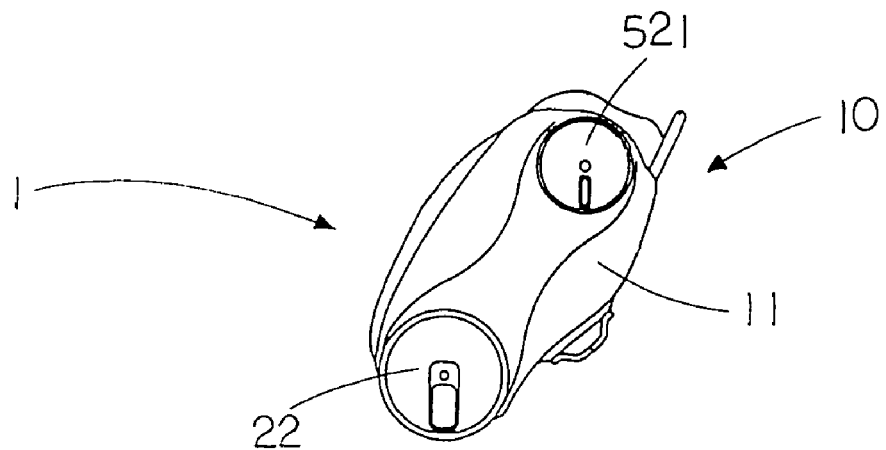

Referring to FIG. 36A to FIG. 36E of the drawings, a folding sequences of the foldable bicycle 1 is illustrated, in which when the folding arrangement 50 is actuated, the steering handles 32 are first folded towards the elongated steering member 31 which is then folded to receive in the main frame, as shown in FIG. 36C of the drawings. Moreover, the front wheel assembly 61, the rear wheel assembly 62, and the rear enclosing cover 132 is the folded towards the main frame 11 and received in the reciving cavity. Finally, the receiving cavity is enclosed by the front enclosing cover 131 and the rear enclosing cover 132 so as to form a compact structure, such as a hand-carry like cage, as shown in FIG. 36E of the drawings.

When the folding arrangement 50 is relieved, due to the respective resilient elements in the steering unit 30, the driving unit 20, the foldable bicycle 1 is adapted to be fully extended and restored to its original shapes.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable bicycle, comprising:
a foldable bicycle frame which comprises a main frame and an enclosing frame foldably connected thereto to define a receiving cavity within said main frame and said enclosing frame;
a wheel assembly comprising a front and a rear wheel assembly rotatably supported by said bicycle frame;
a driving unit operatively mounted on said bicycle frame and connected to said wheel assembly for rotatably driving said bicycle frame to move;
a steering unit which is supported by said bicycle frame, and is longitudinally extended from said front wheel assembly for steering a moving direction of said front wheel assembly; and
a folding arrangement; which comprises:
a folding link connecting said front and said rear wheel assembly, said bicycle driving unit, said steering unit, said enclosing frame, and said main frame in a foldably movable manner; and
a folding actuator operatively mounted on said bicycle frame and connected with said folding link in such a manner that said foldable bicycle is adapted to move between a folded position that said enclosing frame is pivotally moved to enclose said main frame, wherein said front and said rear wheel assembly, said bicycle driving unit and said steering unit are driven by said folding link to foldably receive into said receiving cavity, and an unfolded position that said enclosing frame, said front and said rear wheel assembly, said bicycle driving unit and said steering unit are unfolded from said receiving cavity to extend on said bicycle frame for normal operation.

2. The foldable bicycle, as recited in claim 1, wherein said fold actuator comprises a fold actuation member mounted on said main frame, a fold supporting member, a first transmission pulley and a first operation gear coaxially mounted with said fold actuation member via a main axle, a second operation gear engaging with said first operation gear, and a second transmission pulley coaxially mounted with said second operation gear via a secondary axle on said fold supporting member, in such a manner that said fold actuation member is adapted to drive said first transmission pulley and said first operation gear to rotatably move with respect to said bicycle frame about said main axle, which in turn drive said second operation gear and said second transmission pulley to rotatably move about said secondary axle.

3. The foldable bicycle, as recited in claim 2, wherein said folding link comprises a primary folding link which is linked with said first transmission pulley, and a secondary folding link which is linked with said second transmission pulley, wherein said fold actuation member is adapted to rotatably drive said first and then said second transmission pulley to rotate so as to actuate said first and said secondary folding link to fold said foldable bicycle into said folded position.

4. The foldable bicycle, as recited in claim 3, wherein said first operation gear has a plurality of engaging teeth formed peripherally thereon, and said second operation gear also has a plurality of engaging teeth formed peripherally on a half of a circumference of said second operation gear to define an effective driven distance which is adapted to be driven to rotate by said first operation gear.

5. The foldable bicycle, as recited in claim 4, wherein said foldable arrangement further comprises an auxiliary fold triggering device operatively provided on said foldable bicycle wherein said auxiliary fold triggering device comprises a steering unit trigger, a front wheel trigger, a driving unit trigger, and an enclosing cover trigger which are linked to secondary transmission pulley via said secondary folding link, for facilitating and coordinating a folding operation of said foldable bicycle.

6. The foldable bicycle, as recited in claim 5, wherein said primary folding link comprises a steering folding link, a driving folding link and an enclosing cover folding link which are extended to link said the steering unit, said wheel assembly, said driving unit, and said rear enclosing frame respectively from said first transmission pulley, in such a manner that when said first transmission pulley is driven to rotate, said primary folding link is actuated to drive said steering folding link, said driving folding link and said enclosing cover folding link to fold said steering unit, said driving unit and said enclosing cover respectively into said folded position of said foldable bicycle.

7. The foldable bicycle, as recited in claim 6, wherein said secondary folding link comprises a steering handle trigger link, a steering member trigger link, a driving trigger link, an enclosing cover trigger link, and a front wheel trigger link which are extended to link with said steering unit trigger, said driving unit trigger, said enclosing cover trigger, and said front wheel trigger respectively from said secondary transmission pulley.

8. The foldable bicycle, as recited in claim 7, wherein said steering unit comprises an elongated steering member and two steering handles transversely extended from two sides of said steering member, wherein each of said steering handles comprises a conveying gear having a locking latch outwardly protruded therefrom, and a turning gear engaging with said conveying gear wherein said steering handles are adapted to be pivotally folded towards said steering member in such a manner that said steering handles and said steering member are capable of passing through said folding slot of said front enclosing cover.

9. The foldable bicycle, as recited in claim 8, further comprising a braking system which comprises a front and a rear brake operatively communicated with said front and said rear wheel assemblies, and a brake actuation arrangement which comprises two brake actuation rotors disposed in said two steering handles respectively, two rotor ridges protruded from an inner surface of each said steering handles respectively wherein said respective brake actuation rotor is arranged to be engaged with said respective rotor ridge in a longitudinally movable manner, and two brake cables extended from two inner ends of said brake actuation rotors respectively through said respective conveying gear to said front and said rear brakes in such a manner that when said brake actuation rotors are longitudinally moved to pull said braking cables, said front and said rear brakes are actuated to exert a braking force to said front and said rear wheel assembly respectively.

10. The foldable bicycle, as recited in claim 9, wherein said steering unit trigger comprises two steering handle triggers axially mounted with said two conveying gears respectively, wherein each of said steering handle triggers comprises a circular trigger rotor having a link slot indently and peripherally formed thereon for mounting with said steering handle trigger link, and a steer stopper penetrably mounted on said conveying gear and said circular trigger rotor in a resiliently movable manner for controlling a lateral rotational movement of said conveying gear and said circular trigger rotor, wherein said circular trigger rotor further has a first engaging slot, defining an first inclined sidewall in a first pusher end thereof, formed thereon, and said conveying gear has a first insertion slot, defining a first inclined boundary wall, formed thereon which is substantially aligned with said first engaging slot.

11. The foldable bicycle, as recited in claim 10, wherein said first steering stopper comprises a first main body, a first resilient member mounted in said first main body, and a first stopper head adapted to be slidably pushed to normally extend from said first main body by said first resilient member between a locked position and an unlocked position, wherein in said locked position, said first stopper head is fully extended to penetrate through said first insertion slot to said first pusher end of said first engaging slot wherein said first locking latch is inserted into another end of said first engaging slot, in such a manner that a lateral movement between said circular trigger rotor and said conveying gear is substantially blocked, wherein in said unlocked position, said first stopper head is retracted from said first engaging slot by rotating said circular trigger rotor in such a manner that the said inclined sidewall of said first engaging slot is adapted to rearwardly push said first stopper head disengaging with said first engaging slot and received in said first insertion slot of said conveying gear.

12. The foldable bicycle, as recited in claim 11, wherein said enclosing frame further comprises an enclosing cover movably communicated with said enclosing cover trigger which is mounted on said driving unit via two rear connecting rods in such a manner that said rear enclosing cover is adapted to be pivotally driven to move by said folding arrangement.

13. The foldable bicycle, as recited in claim 12, wherein said enclosing cover trigger comprises a trigger supporting frame mounted on said driving unit, a main trigger gear rotatably mounted in said trigger supporting frame, an cover trigger rotor, having a rotor slot indently and peripherally formed thereon for mounting with said enclosing cover trigger link, coaxially mounted with said main trigger gear, a rear cover rotary gear engaging with said main trigger gear so as to be driven thereby, and a second steering stopper penetrably mounted on said main trigger gear and said cover trigger rotor for controlling a lateral rotational movement of said main trigger gear and said cover trigger rotor.

14. The foldable bicycle, as recited in claim 13, wherein said main trigger gear further has a second locking latch outwardly protruded therefrom for inserting into said second engaging slot of said cover trigger rotor, wherein said second steering stopper comprises a second main body, a second resilient member mounted in said second main body, and a second stopper head adapted to be slidably pushed to normally extend from said second main body between the restricted position and the idle position, wherein in said restricted position, said second stopper head is fully extended from said second main body to penetrate through said second insertion slot to said second pusher end of said second engaging slot wherein said second locking latch is inserted into another end of said second engaging slot, in such a manner that a lateral movement between said cover trigger rotor and said main trigger gear is substantially blocked, wherein in said idle position, said second stopper head is retracted from said second engaging slot by rotating said cover trigger rotor in such a manner that said second inclined sidewall of said second engaging slot is adapted to rearwardly push said second stopper head disengaging with said second engaging slot and received in said second insertion slot of said main trigger gear.

15. The foldable bicycle, as recited in claim 14, wherein said front wheel assembly comprises a front wheel holder, a front wheel rotatably mounted thereon, and a wheel folding hinge movably connecting said front wheel holder and said elongated steering member, wherein said wheel folding hinge has a first operation groove indently formed on a top surface thereof for connecting with said a bottom connecting portion of said elongated steering member in a pivotally movable manner and two first aligned receiving slots indently and transversely formed on two sidewalls of said first operation groove and communicated with said first trigger slot of said elongated steering member.

16. The foldable bicycle, as recited in claim 15, wherein said steering unit trigger further comprises a steering member trigger which is mounted in said first trigger slot of said elongated steering member and said wheel folding hinge, wherein said steering member trigger comprises a first steering trigger rotor, having two first locking indents formed on two sides thereof respectively, rotatably mounted in said first trigger slot and operatively linked with said steering member trigger link which is then extended to said fold actuator, two pusher balls movably received in said two receiving slots of said wheel folding hinge respectively, and two first pusher elements mounted in said two receiving slots for normally applying an inward urging force to said respective first pusher balls within said respective receiving slot, in such a manner that said two first pusher balls are normally pushed to bias against two sides of said first steering trigger rotor so that a rotational movement of said elongated steering member with respect to said front wheel assembly is substantially restricted by said two first pusher balls.

17. The foldable bicycle, as recited in claim 16, wherein said front wheel holder further has a second operation groove indently formed on a top surface thereof for connecting with a bottom coupling portion of said wheel folding hinge in a pivotally movable manner, and two second aligned receiving slots indently and transversely formed on two sidewalls of said second operation groove and communicated with said second trigger slot of said wheel folding hinge, wherein said bottom coupling portion of said wheel folding hinge has a second trigger slot formed therein for mounting said front wheel trigger.

18. The foldable bicycle, as recited in claim 17, wherein said front wheel trigger comprises a second steering trigger rotor, having two second locking indents formed on two sides thereof respectively, rotatably mounted in said second trigger slot and operatively linked with said front wheel folding link, two second pusher balls movably received in said two second receiving slots of said front wheel holder respectively, and two second pusher elements mounted in said two second receiving slots for normally applying an inward urging force to said respective second pusher balls within said respective second receiving slot, in such a manner that said two second pusher balls are normally pushed to bias against said two sides of said second steering trigger rotor so that a rotational movement of said wheel folding hinge with respect to said front wheel holder is substantially restricted by said two second pusher balls.

19. The foldable bicycle, as recited in claim 18, wherein said transmission member of said driving unit comprises a front sustaining member and a rear sustaining member foldably connected with said front sustaining member via said securing device, which comprises an upper fold guider comprising a first guider housing having a first slanted surface, and a first resilient axle longitudinally extended from said first slanted surface, wherein said rear sustaining member has a bottom linkage portion having a first inclined surface downwardly extended towards said securing device and is arranged to correspond and align with said first slanted surface of said upper fold guider.

20. The foldable bicycle, as recited in claim 19, wherein said securing device further comprises a lower fold guider comprising a second guider housing having a second slanted surface, and a second resilient axle longitudinally extended from said second slanted surface, wherein said rear wheel assembly comprises a rear wheel holder having an upper linkage portion which has a second inclined surface upwardly extended towards said securing device and is arranged to correspond and align with said second slanted surface of said lower fold guider.

21. The foldable bicycle, as recited in claim 20, wherein said driving unit trigger comprises a first and a second supporting gear mounted in said securing device wherein said driving trigger link comprises a first drive trigger link and a second drive trigger link movably engaged on said first and said second supporting gears which are arranged to be driven to rotate by a respective pulling force applied on said first and said second drive trigger link by said auxiliary fold actuator.

22. The foldable bicycle, as recited in claim 21, wherein said driving unit trigger further comprises a first and a second blocking member engaged with said first and said second supporting gears respectively, wherein said first and said second blocking member are extended out of said securing device to communicate with said upper linkage portion of said rear sustaining member and said bottom linkage portion of said front sustaining member respectively in such a manner that said first and said second blocking member are adapted to normally block a pivotal movement of said front sustaining member and said rear sustaining member about said first and said second resilient axle respectively.

23. The foldable bicycle, as recited in claim 21, wherein when said front sustaining member and said rear sustaining member are being folded, said front sustaining member and said second sustaining member are substantially guided by said first and said second slanted surfaces respectively in such a manner that said front sustaining member and said rear sustaining member are arranged to oppossedly and transversely displace by a predetermined distance so as to disalign with each other for foldably receiving in said transmission member main frame.

24. The foldable bicycle, as recited in claim 23, wherein said driving unit further comprises an elongated slider mounted on said driving axle wherein said dynamic gear is adapted to slidably move along said elongated slider when said second sustaining member is folded to be transversely displaced as guided by said second slanted surface.

25. The foldable bicycle, as recited in claim 24, wherein said driving unit trigger further comprises a first and a second resilient springs mounted in said securing device and adapted to normally apply an urging force to said first and said second blocking members so as to normally push said blocking member extending out of said securing device for blocking said pivotal movement of said front and said rear sustaining member respectively, in such a manner that when said first and said second drive trigger link are relieved, said first and said second resilient springs are adapted to outwardly push said first and said second blocking member so as to block said pivotal movement of said front and said rear sustaining member.

* * * * *